US012674875B2

(12) United States Patent
Kreiß

(10) Patent No.: US 12,674,875 B2
(45) Date of Patent: Jul. 7, 2026

(54) MODIFIED UART INTERFACE AND UART DATA TRANSMISSION FOR REAL-TIME DATA TRANSMISSION OF ECHO DATA TO A HIGHER-LEVEL COMPUTER SYSTEM

(71) Applicant: ELMOS Semiconductor SE, Dortmund (DE)

(72) Inventor: Dennis Kreiß, Hannover (DE)

(73) Assignee: Elmos Semiconductor SE, Leverkusen (DE)

( * ) Notice: Subject to any disclaimer, the term of this patent is extended or adjusted under 35 U.S.C. 154(b) by 150 days.

(21) Appl. No.: 18/231,739

(22) Filed: Aug. 8, 2023

(65) Prior Publication Data

US 2024/0053459 A1 Feb. 15, 2024

(30) Foreign Application Priority Data

Aug. 10, 2022 (DE) .......................... 102022120105.8
Aug. 10, 2022 (DE) .......................... 102022120106.6

(51) Int. Cl.
| | |
|---|---|
| *G01S 7/527* | (2006.01) |
| *G01S 7/52* | (2006.01) |
| *G01S 15/10* | (2006.01) |

(52) U.S. Cl.
CPC ........ *G01S 7/5273* (2013.01); *G01S 7/52004* (2013.01); *G01S 15/102* (2013.01)

(58) Field of Classification Search
None
See application file for complete search history.

(56) References Cited

U.S. PATENT DOCUMENTS 4,022,058 A * 5/1977 Brown .................... G01F 1/667
73/861.28
4,213,183 A * 7/1980 Mueller ................... G01F 1/66
73/632

(Continued)

FOREIGN PATENT DOCUMENTS

DE 102012017368 A1 3/2014
DE 102021121156 A1 7/2022

(Continued)

OTHER PUBLICATIONS

PEPPERL + Fuchs, UCC****-50GK-B26 Series Ultrasonic Sensors Manual, Jan. 2021 Germany.

(Continued)

*Primary Examiner* — Jonathan D Armstrong
(74) *Attorney, Agent, or Firm* — Mindful IP PLLC

(57) ABSTRACT

A method and a device perform data communication between a superordinate computer system of an ultrasonic measurement system and an associated ultrasonic sensor via a modified UART data interface. The method and device exit the UART protocol and use a special signaling protocol and a modification of the UART data interface for the duration of an ultrasonic measurement phase to transmit the arrival of echoes at the ultrasonic sensor promptly to the superordinate computer system and return to the UART protocol for the data transmission from the ultrasonic sensor to the superordinate computer system after the end of the ultrasonic measurement phase.

43 Claims, 7 Drawing Sheets

(56) References Cited

U.S. PATENT DOCUMENTS

| | | | | | |
|---|---|---|---|---|---|
| 4,944,036 | A | * | 7/1990 | Hyatt | G01S 15/8977 |
| | | | | | 367/43 |
| 5,942,688 | A | * | 8/1999 | Kimura | G01N 29/42 |
| | | | | | 73/598 |
| 2011/0215952 | A1 | * | 9/2011 | Aria | G06F 3/017 |
| | | | | | 341/20 |
| 2012/0266676 | A1 | * | 10/2012 | Barron | G01N 29/11 |
| | | | | | 702/39 |
| 2019/0047019 | A1 | * | 2/2019 | Ding | G01F 23/22 |
| 2019/0154439 | A1 | * | 5/2019 | Binder | G01S 15/42 |

FOREIGN PATENT DOCUMENTS

| | | | | | |
|---|---|---|---|---|---|
| DE | 102021121157 | A1 | * | 7/2022 | |
| EP | 4321895 | A1 | * | 2/2024 | G01S 15/10 |
| JP | 2016019162 | A | * | 2/2016 | |
| WO | 2018210966 | A1 | | 11/2018 | |
| WO | 2020182963 | A2 | | 9/2020 | |

OTHER PUBLICATIONS

PEPPERL + FUCHS, Wayback machine, Ultrasonic Sensor UCC4000-50GK-B26-8MOL, Manual Jan. 18, 2021.

* cited by examiner

MODIFIED UART INTERFACE AND UART DATA TRANSMISSION FOR REAL-TIME DATA TRANSMISSION OF ECHO DATA TO A HIGHER-LEVEL COMPUTER SYSTEM

CROSS-REFERENCE TO RELATED APPLICATIONS

This application claims priority to German Patent Applications DE 10 2022 120 105.8 filed on Aug. 10, 2022, and DE 10 2022 120 106.6 filed on Aug. 10, 2022, the contents of each which are incorporated into the subject matter of the present application by reference.

TECHNICAL FIELD

The disclosure is directed to Modified UART interface and UART data communication for transmitting echo data to a superordinate computer system.

BACKGROUND

Modern ADAS systems (driver assistance systems for autonomous driving) preferentially use ultrasonic sensors in modern vehicles for automatic parking aids. Recently, the market has shown an increasingly clear tendency towards increased data rates, which systems such as LIN data buses and/or other data buses will no longer be able to provide in the future.

The aim of the technical teaching disclosed in this document is to achieve more efficient, faster and more secure data communication between the respective ultrasonic sensor and the superordinate computer system. Market participants also refer to the superordinate computer system as the control unit. Faster data communication enables faster ultrasonic measurement sequences and more data that the superordinate computer system can evaluate. A higher data rate can thus lead to an increase in system performance.

State of the art are the IO communication protocols currently used by products such as Elmos' types 524.09/524.33 and similar products from other manufacturers.

In the initial phase of automotive ultrasonic sensor technology, the input/output protocol was a pure protocol that provided only temporal information (time to detected echoes). Various status information transmitted by the ultrasonic sensor after the ultrasonic measurement supplemented this protocol in subsequent products. The state of the art uses a simple proprietary protocol for configuration, who's logical '0' and '1' are characterized by low phases of different lengths. Disadvantages of this input/output communication are the rather low data rate and the low information content of the measurement data, which only transmits the temporal information of a received echo.

In addition to input/output communication, there are also other interface protocols. Exemplary other interface protocols are currently, for example, the LIN protocol and the DSI3 protocol, which market participants in the market use for these purposes. However, these protocols also result in significantly higher IC and system costs. The technical teaching presented here aims to remedy this without having to accept the above disadvantages.

The document presented here refers in particular to WO 2020 182 963 A2, WO 2018 210 966 A1 and the writings of the corresponding patent family, which deal with compression and data transmission. The technical teachings of these writings do not solve the problem discussed herein.

SUMMARY

The document presented here therefore takes a new, disruptive approach that interrupts and restarts the evolution of previous technical doctrine at a key point.

The proposal is based on the task of creating a solution that does not have the above disadvantages of the prior art and has further advantages. This task is solved by the technical teachings of the independent claims. Further examples are, if necessary, the subject of subclaims.

A technical teaching presented here is that the ultrasonic transmitter communicates with the superordinate computer system by means of a conventional UART interface.

Within an ultrasonic measurement cycle, the ultrasonic sensor and the superordinate computer system interrupt the data communication from the ultrasonic transmitter to the superordinate computer system and switch to a special protocol for fast signaling of reflections (echoes) for the duration of the ultrasonic measurement phase within which the actual measurement time lies, in which the ultrasonic sensor receives reflections of the transmitted ultrasonic burst and/or the transmitted ultrasonic signal, so as not to cause any additional reaction delay.

A technical teaching disclosed here is the extension of the current input/output communication, in particular by a signaling mode within the UART communication in UART mode. Furthermore, the technical teaching disclosed here provides for special signaling pulses and a special, new echo coding (length modulation). A safeguarding of the transmitted data can be carried out by the ultrasonic sensor system comprising the superordinate computer system and the ultrasonic sensor as well as a single-wire data bus or a two-wire data bus with transmit and receive line according to the technical teaching disclosed here, for example, via parity bits and/or CRC data bits and bytes or the like.

Finally, the technical teaching presented here allows the use of extended measurement profiles to improve the efficiency of the communication and to increase the system performance. That is, the technical teaching presented here proposes that the superordinate computer system no longer transmits to the ultrasonic sensor all the parameters of the measurement to be performed immediately prior to the measurement, but rather to define and assign an index to predetermined parameter configurations beforehand and to call up the corresponding parameter configurations by transmitting the index in a command phase. These parameter configurations or measurement profiles may, for example, be stored in the non-volatile memory of the ultrasonic sensor. After starting the control device of the ultrasonic sensor, the control device of the ultrasonic sensor may load these parameter configurations into the volatile memory. These parameter configurations can then also be located in the volatile memory of the ultrasonic sensor. However, the superordinate computer system must then transfer the parameter configurations from the superordinate computer system to the ultrasonic sensor each time the ultrasonic sensor is started. The control device of the ultrasonic sensor then accesses this data in the non-volatile memory or in the volatile memory of the ultrasonic sensor during operation of the ultrasonic sensor in order to use it to set the parameters for the ultrasonic measurements according to the stored measurement profiles.

As disclosed herein, the ultrasonic sensor and the superordinate computer system communicate with each other using a conventional UART data interface. Preferably, a UART data packet includes a start bit, the data and a stop bit, and possibly a parity bit.

This can simplify data communication between the ultrasonic sensor and the superordinate computer system.

During the ultrasonic measurement phase, which is further subdivided into the transmission phase of the ultrasonic signal or ultrasonic burst, the decay phase of the ultrasonic transducer and the reception phase, the ultrasonic sensor now exits the UART protocol and directly signals the reception of an echo by the ultrasonic transducer. Preferably, the ultrasonic transmitter exits this ultrasonic measurement phase again after a predetermined time and resumes communication with the superordinate computer system in accordance with the UART protocol.

Preferably, the ultrasonic sensor according to the proposal performs ultrasonic measurement cycles in temporal succession and not overlapping in time. The ultrasonic measurement cycles are each essentially divided into at least three phases. However, not every ultrasonic measurement cycle must have these three phases. Under conditions mentioned below by way of example, phases of the three phases of the ultrasonic measurement cycles can be missing during the execution of the ultrasonic measurement cycles, in particular at times.

Exemplary First Phase I (In the Following Command Phase)

The start of the first phase, as defined herein, is typically the same as the start of the ultrasonic measurement cycle, as defined herein. The first phase typically includes the transmission of information from the superordinate computer system to the ultrasonic sensor as to what type of ultrasonic measurement the ultrasonic sensor is to perform in one of the subsequent ultrasonic measurement phases. The document presented herein refers to this information hereinafter as a command. Typically, the command also includes a start signal for the temporally subsequent ultrasonic measurement phase. Preferably, it is determined or set or programmed at which temporal interval after receipt of the start signal the ultrasonic sensor starts the ultrasonic measurement phase. Preferably, the command includes, at least at times and/or in some cases, information regarding the characteristics with which the ultrasonic sensor is to generate an ultrasonic burst and/or an ultrasonic signal in one of the subsequent ultrasonic measurement phases. Such properties may be, for example, encoding, chirp (yes/no), chirp direction, chirp speed, number of pulses of the ultrasonic burst, etc. However, a command can also involve the transmission of several ultrasonic bursts in succession, which may differ from each other.

Exemplary Second Phase II (In the Following Ultrasonic Measurement Phase)

The ultrasonic measurement phase of an ultrasonic measurement cycle comprises the execution of the actual measurement and the preferably system clock or UART clock synchronous transmission of the detection of the arrival of echoes at the ultrasonic sensor. The ultrasonic sensor thereby preferably uses as a measure for the arrival of an echo the crossing of the threshold curve by the value progression of the envelope curve signal of the received signal of the ultrasonic transducer or ultrasonic receiver in a first direction. The ultrasonic sensor preferably uses as a measure for the end of the arrival of an echo the undershooting of the threshold curve by the value progression of the envelope curve signal of the received signal of the ultrasonic transducer or ultrasonic receiver in a second direction, which is different from the first direction. This is therefore preferably an echo detection, which the ultrasonic sensor preferably signals to the superordinate computer system synchronously with the system clock of the ultrasonic sensor or synchronously with the UART clock.

Exemplary Third Phase II (In the Following Third Phase of the Ultrasonic Measuring Cycle)

At the beginning of the third phase, the ultrasonic sensor resumes UART communication. In the third phase, the ultrasonic sensor transmits the type of signal objects detected by the ultrasonic sensor and/or their parameters, referred to below as signal object parameters, to the superordinate computer system. These signal objects may be, for example, the echoes explained above. Preferably, the ultrasonic sensor thus transmits in this third phase the information that it has detected an echo and, again preferably, at what time this echo occurred after the start of the ultrasonic measurement phase, again preferably, how large the signal of this echo was, and, again preferably, with what probability it was actually an echo, and, again preferably, how many echoes it was. The ultrasonic sensor thus transmits, for example, the echo time and a so-called confidence value for this echo. The probability value need not be a probability value in the purely mathematical sense. It should only be a parameter that allows the superordinate computer system to distinguish between signals that are sure echoes and those that are not. Preferably, the ultrasonic sensor transmits up to four echoes. Of course, it is conceivable to transmit more or fewer echoes. Preferably, in the third phase, the ultrasonic sensor transmits the data of the echoes in the order in which they are received by the ultrasonic sensor. Of course, it is conceivable to transmit the data of the echoes in reverse order. It is also conceivable to transmit the data of the echoes in any order with a timestamp of the reception or the number of the reception. Furthermore, the ultrasonic sensor preferably transmits diagnostic data to the superordinate computer unit in this third phase of the ultrasonic measurement cycle. This diagnostic data can be, for example, hardware errors of circuit parts of the evaluation circuit inside the ultrasonic sensor and other diagnostic errors. In the third phase of the ultrasonic measurement cycle, the ultrasonic sensor can also transmit other data such as status information, test results, device numbers, bus node addresses, encryption data, and so on. When this document describes a data transmission from the ultrasonic sensor to the superordinate computer system, this can always be understood, among other things, as meaning that, for example, the control device of the ultrasonic sensor reads out data from a device part of the ultrasonic sensor via the internal data bus of the ultrasonic sensor and sends it to the superordinate computer system via the data interface of the ultrasonic sensor directly or after processing via the external data bus. When this document describes a data transmission from the superordinate computer system to the ultrasonic sensor, this can always be understood, among other things, as meaning that, for example, the superordinate computer system sends data to the control device of the ultrasonic sensor and/or to a device part of the ultrasonic sensor via the external data bus and via the data interface of the ultrasonic sensor and via an internal data bus of the ultrasonic sensor. It is conceivable that the control device of the ultrasonic sensor, after receiving such data from the superordinate computer system, directly or indirectly, after processing by the control device of the ultrasonic sensor, transmits such data to other device parts of the ultrasonic sensor via the internal data bus of the ultrasonic sensor. Through this, the superordinate computer system can monitor and control the ultrasonic sensor and read out the measurement results of the ultrasonic sensor.

The technical teaching presented here thus deals with an ultrasonic sensor that exchanges data and commands with a superordinate computer system by means of a UART protocol via a UART data interface of the ultrasonic sensor. In this regard, the ultrasonic sensor performs a method for communicating with the superordinate computer system using the UART protocol. The ultrasonic sensor performs the ultrasonic measurement procedure, in particular for distance measurement in the vicinity of a vehicle, in ultrasonic measurement cycles that follow one another in time and do not overlap in time. The ultrasonic sensor performs the respective current ultrasonic measurement cycle in at least three temporally successive and temporally non-overlapping phases. The ultrasonic sensor starts the ultrasonic measurement cycle at the beginning of the first temporal phase of the ultrasonic measurement cycle. The writing presented herein also refers to this first phase of the ultrasonic measurement cycle as the command phase. Not all ultrasonic measurement cycles include a command phase.

In the sense of the writing presented here, ultrasonic measurement cycles without a command phase are also considered to be three-phase, in which case the command phase has the temporal length 0s. It is conceivable that a command phase can be valid for several subsequent ultrasonic measurement cycles. Therefore, it is conceivable that the command phase can be omitted for these subsequent ultrasonic measurement cycles. Preferably, the number of such subsequent ultrasonic measurement cycles without command phase is exactly predetermined, so that the ultrasonic sensor, after it has passed through these subsequent ultrasonic measurement cycles, preferably expects a command phase again. If this were not the case, the ultrasonic sensor could no longer be controllable.

For purposes of the writing presented herein, such subsequent further ultrasonic measurement cycles without their own command phase are also at least three-phase since the associated command phase of such a subsequent ultrasonic measurement cycle is the command phase of a preceding ultrasonic measurement cycle.

Preferably, in the command phase, the ultrasonic sensor receives a command from the superordinate computer system using the UART protocol via a UART data interface.

Preferably, the command specifies, among other things, which type of measurement the ultrasonic sensor is to perform in an ultrasonic measurement cycle, in particular in the ultrasonic measurement phase of the current ultrasonic measurement cycle that temporally follows the command phase.

Preferably, the ultrasonic sensor emits an ultrasonic burst or an ultrasonic signal at the beginning of the second phase, hereinafter referred to as the ultrasonic measurement phase. This ends the command phase. The ultrasonic transmitter does not receive any data via the UART data interface during the ultrasonic measurement phase. Instead, in the ultrasonic measurement phase, the ultrasonic transmitter uses the driver stage of the UART data interface to signal the detection of the reception of echoes to the superordinate computer system. Thus, according to the proposal, the UART data interface of the ultrasonic sensor explicitly does not operate in the UART mode with data transmission in the UART protocol in the ultrasonic measurement phase, but in a new signaling mode that differs from the UART mode and comprises a special data protocol for particularly timely signaling of detected events, in particular echoes, from the ultrasonic sensor to the superordinate computer system. This provides the superordinate computer system with information about potentially dangerous obstacles in the vicinity of the vehicle in a timely manner and at short notice, enabling it to respond quickly. This is the only way to meet safety requirements in accordance with ISO 26262. Typically, edge changes of the data line of the ultrasonic measurement phase occur synchronously in an essentially fixed phase relationship to the UART clock. More precisely, the edge changes are preferably synchronous with the processing of the receive signals of the ultrasonic transducer. Preferably, the ultrasonic sensor forms an internal transmit clock signal at a transmit frequency of the ultrasonic transducer for driving the ultrasonic transducer. Preferably, the ultrasonic sensor forms a signal for clocking the data line for this purpose, which is preferably in a fixed phase relationship with the transmit clock signal for generating the transmit signal for driving the ultrasonic transducer. Preferably, the edge changes of the signal for clocking the data line in the ultrasonic measurement phase are edge-synchronous to the edges of the transmit clock signal. The signal for clocking the data line, the UART clock, can have a frequency that is preferably an integer multiple of the transmit clock signal. However, the signal for clocking the data line, the UART clock, may also have a smaller frequency than the frequency of the transmit clock signal. In the latter case, the frequency of the transmit clock signal is preferably an integer multiple of the frequency of the signal for clocking the data line, the UART clock.

Whenever the ultrasonic sensor has calculated a new value of the envelope curve, the ultrasonic sensor preferably compares this value of the envelope curve with the currently valid value of the threshold curve and decides whether an edge change of the data line takes place or not. In that case, the ultrasonic sensor can signal the overshoot and/or undershoot of the value of the envelope curve relative to the threshold curve. Instead of signaling the overshooting and/or undershooting of the threshold curve, however, the ultrasonic sensor can also check whether there is a local temporal maximum of the envelope curve above the current threshold curve. If necessary, when the ultrasonic sensor has calculated a new value of the envelope curve, the ultrasonic sensor checks for this purpose whether a maximum of the envelope curve is present and whether the associated maximum value of the envelope curve is above the threshold curve. A problem of the maximum detection is a time delay firstly due to the time between the crossing of the threshold curve by the time course of the envelope curve and the occurrence of the maximum and secondly due to the fact that for the detection of the maximum the descent of the envelope curve must have already started for sure. I.e., the maximum detection may lead to an unacceptable delay. However, maximum detection has significant advantages in terms of precision, etc. It therefore makes sense if the superordinate computer system causes the ultrasonic sensor to switch between the two signalizations from time to time by means of appropriate commands in the command phase to ensure optimum detection.

The characteristics of the ultrasonic burst or ultrasonic signal that the ultrasonic sensor prefers to emit at the beginning of the ultrasonic measurement phase typically depend on a temporally preceding and/or the immediately temporally preceding command that the ultrasonic sensor received in a temporally preceding and/or the immediately temporally preceding command phase. For example, the command previously received by the ultrasonic sensor may specify exactly what type of ultrasonic burst or ultrasonic signal the ultrasonic transmitter is to emit in the immediately following ultrasonic measurement phase. However, it is also conceivable that the command defines only some of the conceivable parameters of the ultrasonic burst or ultrasonic signal to be emitted in the ultrasonic measurement phase. Preferably, the ultrasonic sensor then adopts these unchanged parameters of the ultrasonic burst or ultrasonic signal on a preceding ultrasonic measurement cycle or from the immediately preceding ultrasonic measurement cycle. For example, it is conceivable that the command reverses the chip direction and thus only swaps the function of the lower corner frequency and the start frequency of the ultrasonic burst or ultrasonic signal but leaves the frequency values unchanged. Accordingly, it is conceivable that a command sets parameters of the ultrasonic burst or the ultrasonic signal for several ultrasonic measurement cycles. Such parameters can be, for example, the start frequency of the ultrasonic burst or the end frequency of the ultrasonic burst.

The ultrasonic sensor typically interrupts the data communication from the ultrasonic sensor to the superordinate computer system in the UART mode with the UART protocol for the duration of the ultrasonic measurement phase and switches to a mode of data communication, which the document presented hereafter refers to as signaling mode, in which the ultrasonic sensor directly signals the occurrence of predetermined events promptly during the ultrasonic measurement phase via the data line by means of signal pulses. Accordingly, the ultrasonic sensor does not transmit any information other than these pulses to the superordinate computer system during the ultrasonic measurement phase. In particular, the ultrasonic sensor does not perform any data communication from the ultrasonic sensor to the superordinate computer system according to the UART protocol during the ultrasonic measurement phase. Instead, the ultrasonic sensor performs data communication from the ultrasonic sensor to the superordinate computer system in the ultrasonic measurement phase according to a special signaling protocol. Preferably, the ultrasonic sensor has a system clock generator for generating a system clock that supplies one or more digital device subcircuits of the ultrasonic sensor with one or more clocks of a clock system of the ultrasonic sensor.

The ultrasonic sensor may also have a UART clock generator for generating a UART clock that supplies one or more digital device subcircuits of the UART data interface of the ultrasonic sensor with one or more clock signals of a clock system of the UART data interface of the ultrasonic sensor. Preferably, the system clock of the system clock generator is stable such that the phase difference between the system clock and the synchronization clock used by the superordinate computer system in the command phase to generate the synchronization command is less than 40% of half the system clock period, more preferably less than 20% of half the system clock period, more preferably less than 10% of half the system clock period.

Instead of serial UART data transmission, the ultrasonic sensor puts the signal of the data bus of the UART data interface of the ultrasonic sensor to a first logical value during the ultrasonic measurement phase when the ultrasonic sensor does not receive an echo.

Instead of the serial UART data transmission, the ultrasonic sensor applies the signal of the data bus of the UART data interface of the ultrasonic sensor to a second logical value during the ultrasonic measurement phase when the ultrasonic sensor receives an echo, the second logical value preferably being different from the first logical value.

For example, the ultrasonic sensor can terminate the ultrasonic measurement phase after a predetermined time and/or when predetermined conditions are present. Preferably, the ultrasonic sensor includes a timer to detect the elapsed time of the ultrasonic measurement phase. If a predetermined time has elapsed since the start of the ultrasonic measurement phase or a functionally equivalent time with another reference point, the ultrasonic sensor preferably terminates the ultrasonic measurement phase. The ultrasonic sensor then begins the third phase of the ultrasonic measurement cycle.

The ultrasonic sensor restarts communication between the ultrasonic sensor and the superordinate computer system in accordance with the UART protocol when the ultrasonic measurement phase ends and/or the third phase of the ultrasonic measurement phase begins. Thus, when the end of the ultrasonic measurement phase is reached, the ultrasonic sensor preferably restarts UART data transmission of data from the ultrasonic sensor to the superordinate computer unit.

The ultrasonic sensor is thus set up to transmit data in the third phase of the ultrasonic measurement cycle from the ultrasonic sensor to the superordinate computer system.

This has the advantage that the superordinate computer system can configure the ultrasonic sensor very quickly in the command phase and can quickly provide an increased amount of measurement data to the superordinate computer system in the third phase of the ultrasonic measurement cycle. This is of particular importance for safety-related systems, which should ensure a timely response from a vehicle's safety systems.

In a first example of the ultrasonic sensor presented in this paper, for example, the data that the ultrasonic sensor may transmit from the ultrasonic sensor to the superordinate computer system during the third phase of the ultrasonic measurement cycle may include one or more of the following:

1. Status information that reflects measured values of physical parameters of the ultrasonic sensor, whereby the ultrasonic sensor here preferably transmits measured values of voltage values of lines within the ultrasonic sensor with respect to a reference potential and/or measured values of current values within lines within the ultrasonic sensor as data to the superordinate computer system;

2. Status information reflecting logical values of logical switching networks within the ultrasonic sensor;

3. Status information reflecting results of self-tests of the ultrasonic sensor;

4. Status information reflecting measured values of the ultrasonic transmission path of the ultrasonic sensor into which the ultrasonic sensor transmits and/or from which it receives ultrasonic signals;

5. Status information indicating what type of ultrasonic burst and/or ultrasonic signal the ultrasonic sensor wants to have emitted in the immediately preceding ultrasonic measurement phase;

6. Status information indicating values of the ultrasonic burst and/or ultrasonic signal of the ultrasonic sensor that the ultrasonic sensor claims to have emitted in the immediately preceding ultrasonic measurement phase;

7. Information indicating values of the ultrasonic burst and/or ultrasonic signal of the that the ultrasonic sensor wants to have received in the immediately preceding ultrasonic measurement phase;

8. echo information representing measured values of the echoes received in the ultrasonic measurement phase, these measured values representing in particular the number of the echo and/or the time of reception of the echo and/or a confidence value for the probability that the echo is actually an echo of an object in the ultrasonic transmission path of the ultrasonic sensor into which the ultrasonic sensor transmits and/or from which it receives ultrasonic signals;

9. Command information indicating which command(s) the ultrasonic sensor received in any of the preceding command phases and/or in the immediately preceding command phase;

10. Command information indicating which command or commands the ultrasonic sensor received in any of the preceding command phases and/or in the immediately preceding command phase, and which determined which type of ultrasonic burst or ultrasonic signal the ultrasonic sensor emitted;

11. Check information of the data transmitted in the third phase of the ultrasonic measurement cycle, in particular CRC data or the like, wherein the superordinate computer system can check this check information to verify the proper reception of the data transmitted by the ultrasonic sensor to the superordinate computer system in the third phase of the ultrasonic measurement cycle;

12. Check information of the information signaled in the ultrasonic measurement phase, wherein the superordinate computer system can check this check information to verify proper reception of the information signaled in the ultrasonic measurement phase;

13. Check information of the commands signaled in the command phase, wherein the superordinate computer system can check this check information to verify proper reception by the ultrasonic sensor of the commands signaled in the command phase;

14. Check information of the commands signaled in the command phase, indicating whether the ultrasonic sensor detected an error during the transmission of one or more commands in the command phase;

15. Test information reflecting the results of self-tests or tests of the ultrasonic sensor;

16. Length information that indicates or makes it possible to calculate how much data the ultrasonic sensor will transmit from the ultrasonic sensor to the superordinate computer system in the third phase of the ultrasonic measurement cycle.

17. The status information, which the ultrasonic sensor transmits to the superordinate computer system in the third phase of the ultrasonic measurement cycle and which preferably reflects measured values of physical parameters and/or analog signals within and in the vicinity of the ultrasonic sensor, preferably comprises internal, voltage values of lines within the ultrasonic sensor with respect to a reference potential, for example a ground line, and/or measured values of current values within lines within the ultrasonic sensor. These values should typically be within predetermined value intervals so that the superordinate computer system can use them, for example, as diagnostic values and/or as control parameters for correcting ultrasonic sensor operating parameters. An exemplary value that the superordinate computer system can learn in this way can be, for example, a temperature of a device part of the ultrasonic sensor.

18. Status information reflecting logical values of logical switching networks within the ultrasonic sensor may include, for example, information provided by device parts of the ultrasonic sensor to the superordinate computer unit. Such information may include, for example, results of self-tests, error flags, etc.

19. Status information reflecting results of self-tests of the ultrasonic sensor. This can be, for example, register values of BIST (Build-In-Self-Test) devices of the ultrasonic sensor or of sub-devices of the ultrasonic sensor. Also, it may be measured values of analog values of voltage values of circuit nodes within the ultrasonic sensor and/or current values of electric currents of electric lines within the ultrasonic sensor and/or measured values of other physical parameters. Such other physical parameters may be, for example, temperature readings from locations within the ultrasonic sensor or from outside the ultrasonic sensor, in particular from the environment thereof. Also, such other physical parameters may be, for example, recorded mechanical parameters of device parts of the ultrasonic sensor. Here, for example, measured values of the vibration behavior and/or the damping behavior of the vibrating bodies of the ultrasonic sensor may be considered. Furthermore, such measured values may be, for example, travel time values of ultrasonic signals from other ultrasonic sensors to this ultrasonic sensor and/or the determined parameters of such ultrasonic signals between ultrasonic systems within an ultrasonic system with several ultrasonic sensors, of which the ultrasonic sensor and the superordinate computer system are a part. The device parts, for example, the one or more ultrasonic sensors and the superordinate computer system, of such an ultrasonic system are preferably at least partially interconnected via one or more data links.

20. Status information reflecting measured values of the ultrasonic transmission path of the ultrasonic sensor into which the ultrasonic sensor transmits and/or from which it receives ultrasonic signals. Preferably, the ultrasonic sensor in operation characterizes the transmission path from the ultrasonic sensor to an object and back. In the simplest case, this data may be data about an object. However, it may also be data indicating, for example, how a previously detected echo, for example, is likely to change until the next measurement, or data that enables or supports such a prediction.

21. Status information indicating which type of ultrasonic burst and/or ultrasonic signal the ultrasonic sensor wants to have emitted in a preceding ultrasonic measurement phase. Here, the ultrasonic sensor typically passes the data of the emitted ultrasonic burst or ultrasonic signal or one or more parameters of the parameters with which the sub-device of the ultrasonic sensor was configured when emitting a preceding ultrasonic burst or ultrasonic signal. This enables the superordinate computer system to verify the correctness of the configuration of the ultrasonic sensor and the relevant sub-devices of the ultrasonic sensor.

22. Status information indicating which type of ultrasonic burst and/or ultrasonic signal the ultrasonic sensor wants to have emitted in the immediately preceding ultrasonic measurement phase. Here, the ultrasonic sensor typically transfers the data of the immediately preceding transmitted ultrasonic burst or ultrasonic signal or one or more parameters of the parameters with which the sub-device of the ultrasonic sensor was configured when transmitting an immediately preceding ultrasonic burst or ultrasonic signal. This enables the superordinate computer system to verify the correctness of the configuration of the ultrasonic sensor and the relevant sub-devices of the ultrasonic sensor.

23. Information indicating values of the ultrasonic burst and/or ultrasonic signal that the ultrasonic sensor wants to have received in the immediately preceding ultrasonic measurement phase. This can be, for example:
   a. by the value of a detected time delay of a received ultrasonic burst and/or an ultrasonic signal with respect to a reference time within the ultrasonic measurement phase and/or b. by the value of a received maximum amplitude of the received ultrasonic burst and/or the received ultrasonic signal and/or c. by a determined value of an evaluation of the received ultrasonic burst and/or the received ultrasonic signal (confidence level), and/or d. by a value indicating whether the received ultrasonic burst and/or the received ultrasonic signal had an encoding, and/or e. by a value indicating whether the received ultrasonic burst and/or the received ultrasonic signal exhibited a chirp, and/or f. by a value indicating whether the received ultrasonic burst and/or the received ultrasonic signal exhibited a chirp of a particular chirp direction, and/or g. by a value indicating whether the received ultrasonic burst and/or the received ultrasonic signal is correlated with an ultrasonic burst previously received in a temporally preceding ultrasonic measurement cycle and/or an ultrasonic signal previously received in a temporally preceding ultrasonic measurement cycle, which, in the case of moving objects in the vicinity of the ultrasonic sensor, may, for example, concatenate the echoes of such a moving object over several ultrasonic measurement cycles.

24. echo information representing measured values of the echoes received in the ultrasonic measurement phase, these measured values representing in particular the number of the echo within the current ultrasonic measurement cycle and/or in particular the number of the echo within a predetermined number of ultrasonic measurement cycles and/or in particular the number of the echo since the start-up of the ultrasonic measurement cycle and/or the time of reception of the echo and/or the maximum amplitude of the echo and/or a confidence value for the probability, that the echo is actually an echo of an object in the ultrasonic transmission path of the ultrasonic sensor into which the ultrasonic sensor transmits and/or from which the ultrasonic sensor receives ultrasonic signals. This has the advantage that the ultrasonic sensor here provides the superordinate computer system with further additional information that enables the superordinate computer system to reliably evaluate the received echoes.

25. Command information indicating which commands or which command the ultrasonic sensor received in one of the preceding command phases and/or in the immediately preceding command phase. This enables the superordinate computer system to check whether the ultrasonic sensor has correctly recognized and executed the transferred commands. For example, the ultrasonic sensor can also signal deviations from the specifications here to the superordinate computer system, for example due to any kind of emergency but necessary run of the ultrasonic sensor.

26. Command information indicating which commands or command the ultrasonic sensor received in one of the preceding command phases and/or in the immediately preceding command phase and which determined which type of ultrasonic burst or ultrasonic signal the ultrasonic sensor emitted. This also allows the superordinate computer system to verify that the ultrasonic sensor has correctly detected and executed the transmitted commands. For example, the ultrasonic sensor can again signal deviations from the specifications to the superordinate computer system, for example due to any kind of emergency but necessary run of the ultrasonic sensor, 27. Check information of the data transmitted in the third phase of the ultrasonic measurement cycle, in particular CRC (Cyclic Redundancy Check) data or the like, wherein the superordinate computer system can check this check information to verify the proper reception of the data transmitted by the ultrasonic sensor to the superordinate computer system in the third phase of the ultrasonic measurement cycle. For more information, see, for example, https://de.wikipedia.org/wiki/Zyklische_Redundanzpr%C3%BCfung. According to Wikipedia (download 22 Jul. 2022), the cyclic redundancy check (CRC) is a "procedure for determining a test value for data in order to be able to detect errors during transmission or storage. Ideally, the procedure can even independently correct the received data to avoid retransmission."

28. Check information of the information signaled in the ultrasonic measurement phase, whereby the superordinate computer system can check this check information in order to check the proper reception of the information signaled in the ultrasonic measurement phase. Provided that the superordinate computer system and the ultrasonic sensor use suitable check information, the superordinate computer system can use this to detect, if necessary, incorrect signaling of the information in the ultrasonic measurement phase from the ultrasonic sensor to the superordinate computer system and correct it, if still possible. Since the ultrasonic sensor transmits the information in the ultrasonic measurement phase in a clocked manner synchronized with the system clock or the UART clock or the transmit clock of the transmit clock signal, the bits thus transmitted over the data bus in the ultrasonic measurement phase can, for example, be regarded as one long data word. The ultrasonic sensor can calculate and transmit to the superordinate computer system a first check information—for example, a parity bit or a CRC status word or the like—for this extremely long data word of the signaling of the transmission of the information in the ultrasonic measurement phase or for parts thereof. Subsequently, the superordinate computer system can detect faulty information signaling in the ultrasonic measurement phase. For this purpose, the superordinate computer system preferably calculates a computer system-side, second test information in an analogous manner from the data received by the superordinate computer system from the ultrasonic sensor in the ultrasonic measurement phase and compares this second test information with the first test information which the superordinate computer system has received from the ultrasonic sensor. In the event of a mismatch between the first check information and the second check information, for example, the superordinate computer system may discard the information received from the ultrasonic sensor in the ultrasonic measurement phase or use it in at least a harmless manner or at least in a less harmful manner.

29. check information of the commands signaled in the command phase, wherein the superordinate computer system can check this check information to verify proper reception by the ultrasonic sensor of the commands signaled in the command phase. For example, the ultrasonic sensor may determine the check information of the received command in the command phase and reflect it back to the superordinate computer system here.

30. Check information of the commands signaled in the command phase, indicating whether the ultrasonic sensor detected an error during the transmission of one or more commands in the command phase. This is particularly possible if the superordinate computer system transmits one or more commands to the ultrasonic sensor with a first check information, for example a parity bit and/or CRC check data. Preferably, the ultrasonic sensor determines a second check information based on the received command(s) and checks it opposite to the first check information. This allows the ultrasonic sensor to detect an incorrect command and avoid misconfiguration of the ultrasonic sensor in the middle of operation. By providing feedback to the superordinate computer system, the ultrasonic sensor enables the superordinate computer system to take countermeasures in the event that a command is transmitted to the ultrasonic sensor incorrectly, such as resending the unsuccessfully transmitted command to the ultrasonic sensor . . . ;

31. Length information that indicates or makes it possible to calculate how much data the ultrasonic sensor will transmit from the ultrasonic sensor to the superordinate computer system in the third phase of the ultrasonic measurement cycle.

In a second example of the ultrasonic sensor disclosed herein, the ultrasonic sensor typically generates a received signal internally within the ultrasonic sensor from an ultrasonic transducer of the ultrasonic sensor or an ultrasonic receiver of the ultrasonic sensor. The ultrasonic sensor preferably forms this signal in response to an ultrasonic acoustic signal that the ultrasonic sensor receives or has received.

One problem is that the UART data interface of the ultrasonic sensor requires a UART clock that is frequency and phase stable to the clock used by the superordinate computer system for its UART data interface.

To this end, the document presented herein first proposes that the ultrasonic sensor transmit a synchronization signal to synchronize the UART clock frequency of a participant of the UART communication via the UART data interface. By doing so, the ultrasonic sensor can synchronize the UART clock generator of the superordinate computer system, and thus the UART clock of the UART data interface of the superordinate computer system, with the UART clock of the UART data interface of the ultrasonic sensor. For example, the UART data interface of the ultrasonic sensor may send a synchronization pulse or a sequence of alternating ones and zeros (sequences 01010101 . . . or 10101010 . . . ). For example, the UART data interface of the superordinate computer system may detect such a synchronization signal and provide a corresponding actual frequency and/or phase signal to the UART clock generator of the superordinate computer system, whereupon the UART clock generator of the superordinate computer system readjusts the UART clock of the superordinate computer system so that ultimately the UART clock of the superordinate computer system then operates synchronously and substantially at the same frequency as the UART clock or system clock of the ultrasonic sensor.

To this end, the document presented herein proposes, secondly, that the superordinate computer system transmits a synchronization signal for synchronizing the UART clock frequency of a participant of the UART communication via the UART data interface. This allows the superordinate computer system to synchronize the UART clock generator of the ultrasonic sensor, and thus the UART clock of the UART data interface of the ultrasonic sensor, with the UART clock of the UART data interface of the superordinate computer system. For example, the UART data interface of the superordinate computer system may send a synchronization pulse or a sequence of alternating ones and zeros (sequences 01010101 . . . or 10101010 . . . ). For example, the UART data interface of the ultrasonic sensor may detect such a synchronization signal and provide a corresponding actual signal for the frequency and/or phase to the UART clock generator of the ultrasonic sensor, whereupon the UART clock generator of the ultrasonic sensor readjusts the UART clock of the ultrasonic sensor so that ultimately the UART clock of the ultrasonic sensor then operates synchronously and substantially at the same frequency as the UART clock or system clock of the superordinate computer system.

In a third variation of the apparatus disclosed herein, the ultrasonic sensor has a system clock and/or a UART system clock of the UART data interface. In this third variant, the ultrasonic sensor changes parameters of the system clock and/or the UART system clock depending on a synchronization signal typically transmitted to the ultrasonic sensor by the superordinate computer system for synchronizing the UART clock frequency.

In a fourth example, the ultrasonic sensor may receive one or more commands in the command phase. Preferably, the ultrasonic sensor checks such a received command or a received combination of multiple received commands for allowability. Preferably, the ultrasonic sensor executes one or more received and allowed commands preferably within the ultrasonic measurement phase or subsequent third phase within the ultrasonic measurement cycle, or at least within one or more of the subsequent ultrasonic measurement phases. Such a command may include one or more of the following commands and/or subcommands.

A command and/or subcommand received by the ultrasonic sensor may be, for example, synchronization information for synchronizing a system clock of the ultrasonic sensor and/or a UART clock of the UART data interface of the ultrasonic sensor with, for example, the UART clock and/or a system clock of the superordinate computer system.

A command and/or subcommand received by the ultrasonic sensor can, for example, be length information indicating the length of the subsequent command or the remainder of the command and/or how many command data the subsequent command or the remainder of the command comprises. The superordinate computer system can transmit this length to the ultrasonic sensor in bits, bytes, data words, number of commands and the like, for example, depending on the implementation. The length of the command that the superordinate computer system transmits to the ultrasonic sensor in the command phase, for example as a subcommand, can be the length of the command, and/or the length of the remainder of the command and/or the length of several commands and/or the length of subcommands of the command and/or the length of a group of subcommands of the command.

A command and/or subcommand received by the ultrasonic sensor may, for example, be a check information, in particular a check bit and/or a check value, such as in particular a CRC check sum, of the command and/or of several commands and/or of subcommands of the command and/or of a group of subcommands of the command.

For example, a command and/or subcommand received by the ultrasonic sensor may be a number of subcommands that make up the entire command. This allows the ultrasonic sensor to verify that it has detected the correct number of commands and/or subcommands. For example, if the ultrasonic sensor determines that it has not detected the correct number of commands or subcommands, it may discard all commands in such a command or subcommand sequence.

For example, a command and/or subcommand received by the ultrasonic sensor may be a command or subcommand that signals to the ultrasonic sensor that the ultrasonic sensor should repeatedly perform the ultrasonic measurement in the ultrasonic measurement phase in the same manner as the ultrasonic sensor performed it during the last measurement in the last ultrasonic measurement phase of the last ultrasonic measurement cycle. This reduces the necessary bus bandwidth.

For example, a command and/or subcommand received by the ultrasonic sensor may be a command or subcommand that the ultrasonic sensor repeatedly perform a measurement in the ultrasonic measurement phase in the manner that the ultrasonic sensor performed a previous measurement in a previous ultrasonic measurement phase of a previous ultrasonic measurement cycle.

For example, a command and/or subcommand received by the ultrasonic sensor may be a command or subcommand that the ultrasonic sensor should perform the measurement in a subsequent ultrasonic measurement phase according to a predetermined form known to the ultrasonic sensor. For example, the ultrasonic sensor may have a measurement method, typically more than one measurement method with predetermined parameters for measurement in the ultrasonic measurement phase, that the ultrasonic sensor may use. By the foregoing command, the ultrasonic sensor then preferably selects the measurement method known to it according to the received command and then performs that measurement method in a subsequent ultrasonic measurement phase.

For example, a command and/or subcommand received by the ultrasonic sensor may be a command or subcommand that signals to the ultrasonic sensor that the ultrasonic sensor is to perform the measurement in the ultrasonic measurement phase immediately following this command phase according to one of these predetermined forms or methods known to the ultrasonic sensor. Such methods and/or forms may include, for example, the type of ultrasonic burst or ultrasonic signal emitted (frequency, coded vs. uncoded, type of coding, chirp, chirp direction, maximum frequency, minimum frequency, center frequency amplitude, etc.) and/or the type of measurement data processing) and/or the type of measurement data processing (storage, filtering, processing by pattern recognition, processing by AI programs, etc.) and/or the intermediate storage of intermediate results and/or the measurements in a sequence of ultrasonic measurement cycles and/or the omission of phases within ultrasonic measurement cycles of a sequence of ultrasonic measurement cycles are concerned.

A command and/or subcommand received by the ultrasonic sensor may, for example, be a command or subcommand that signals to the ultrasonic sensor that the ultrasonic sensor is to perform the measurement in a subsequent ultrasonic measurement phase with an ultrasonic burst that is to show a chirp corresponding to a previously performed chirp direction in a previously performed ultrasonic measurement cycle. This eliminates the need to retransmit the parameters of the ultrasonic burst or ultrasonic signal. A command and/or subcommand received by the ultrasonic sensor can therefore also be, for example, a command or subcommand that signals to the ultrasonic sensor that the ultrasonic sensor is to perform the measurement in the immediately following ultrasonic measurement phase with an ultrasonic burst that is to show a chirp corresponding to the last immediately previously performed chirp direction in the immediately previously performed ultrasonic measurement cycle.

However, a command and/or subcommand received by the ultrasonic sensor may also be, for example, a command or subcommand that signals the ultrasonic sensor to perform the measurement in a subsequent ultrasonic measurement phase with an ultrasonic burst that is to exhibit a chirp opposite to a previously performed chirp direction in a previously performed ultrasonic measurement cycle. An equivalent request for the purposes of this writing would be a command and/or subcommand received by the ultrasonic sensor, which may be, for example, a command or subcommand that signals to the ultrasonic sensor that the ultrasonic sensor is to perform the measurements in subsequent ultrasonic measurement phases of successive ultrasonic measurement cycles with a respective ultrasonic burst in each case that is to show a chirp opposite to the immediately previously performed chirp direction in the immediately previously performed ultrasonic measurement cycle. That is, the chirp direction then alternates from ultrasonic measurement cycle to ultrasonic measurement cycle. A command and/or subcommand received by the ultrasonic sensor may thus also be, for example, a command or subcommand that signals to the ultrasonic sensor that the ultrasonic sensor is to perform the measurement in the immediately following ultrasonic measurement phase with an ultrasonic burst that is to show a chirp opposite to the last immediately previously performed chirp direction in the immediately previously performed ultrasonic measurement cycle.

However, a command and/or subcommand received by the ultrasonic sensor may also be, for example, a command or subcommand that signals to the ultrasonic sensor that the ultrasonic sensor is to perform the measurement in a subsequent ultrasonic measurement phase with an ultrasonic burst that is to show a chirp-down.

However, a command and/or subcommand received by the ultrasonic sensor may also be, for example, a command or subcommand that signals to the ultrasonic sensor that the ultrasonic sensor is to perform the measurement in the immediately following ultrasonic measurement phase with an ultrasonic burst that is to exhibit a chirp-down.

However, a command and/or subcommand received by the ultrasonic sensor may also be, for example, a command or subcommand that signals to the ultrasonic sensor that the ultrasonic sensor is to perform the measurement in a subsequent ultrasonic measurement phase with an ultrasonic burst that is to show a chirp-up.

However, a command and/or subcommand received by the ultrasonic sensor may also be, for example, a command or subcommand that signals to the ultrasonic sensor that the ultrasonic sensor is to perform the measurement in the immediately following ultrasonic measurement phase with an ultrasonic burst that is to show a chirp-up.

However, a command and/or subcommand received by the ultrasonic sensor may also be, for example, a command or subcommand that signals to the ultrasonic sensor that the ultrasonic sensor is to perform the measurement in a subsequent ultrasonic measurement phase with an ultrasonic burst that is to exhibit a predetermined frequency.

However, a command and/or subcommand received by the ultrasonic sensor may also be, for example, a command or subcommand that signals to the ultrasonic sensor that the ultrasonic sensor is to perform the measurement in the immediately following ultrasonic measurement phase with an ultrasonic burst that is to exhibit a predetermined frequency.

However, a command and/or subcommand received by the ultrasonic sensor may also be, for example, a command or subcommand that signals to the ultrasonic sensor that the ultrasonic sensor is to perform the measurement in a subsequent ultrasonic measurement phase with an ultrasonic burst that is to exhibit a predetermined or transmitted start frequency.

However, a command and/or subcommand received by the ultrasonic sensor may also be, for example, a command or subcommand that signals to the ultrasonic sensor that the ultrasonic sensor is to perform the measurement in the immediately following ultrasonic measurement phase with an ultrasonic burst that is to exhibit a predetermined or transmitted start frequency.

However, a command and/or subcommand received by the ultrasonic sensor may also be, for example, a command or subcommand that signals to the ultrasonic sensor that the ultrasonic sensor is to perform the measurement in a subsequent ultrasonic measurement phase with an ultrasonic burst that is to exhibit a predetermined or transmitted final frequency.

However, a command and/or subcommand received by the ultrasonic sensor may also be, for example, a command or subcommand that signals to the ultrasonic sensor that the ultrasonic sensor is to perform the measurement in the immediately following ultrasonic measurement phase with an ultrasonic burst that is to exhibit a predetermined or transmitted final frequency.

However, a command and/or subcommand received by the ultrasonic sensor may also be, for example, a command or subcommand that signals to the ultrasonic sensor that the ultrasonic sensor is to perform the measurement in a subsequent ultrasonic measurement phase with an ultrasonic burst that is to have a predetermined number of ultrasonic pulses.

However, a command and/or subcommand received by the ultrasonic sensor may also be, for example, a command or subcommand that signals to the ultrasonic sensor that the ultrasonic sensor is to perform the measurement in the immediately following ultrasonic measurement phase with an ultrasonic burst that is to have a predetermined number of ultrasonic pulses.

With some of the above commands, the superordinate computer system can control the emitted ultrasonic bursts or ultrasonic signals and other parameters.

However, a command and/or subcommand received by the ultrasonic sensor may also be, for example, a command or subcommand that signals to the ultrasonic sensor that the ultrasonic sensor is to perform the measurement in one or more subsequent ultrasonic measurement phases comprising a plurality of successive ultrasonic bursts, each of which is to have a predetermined number of ultrasonic pulses.

However, a command and/or subcommand received by the ultrasonic sensor can also be, for example, a command or subcommand that signals to the ultrasonic sensor that in n subsequent ultrasonic measurement cycles of the ultrasonic sensor, the ultrasonic sensor is to skip the command phase, where n is a positive integer greater than or equal to 0. This can be useful, for example, if the ultrasonic sensor is to successively execute several ultrasonic measurement cycles, each with different ultrasonic bursts in the ultrasonic measurement phase, where these ultrasonic bursts can differ, for example, by the number of their ultrasonic pulses and/or by their duration.

However, a command and/or subcommand received by the ultrasonic sensor may also be, for example, a command or subcommand that signals to the ultrasonic sensor that one or more of the above subcommands comprises content and/or effect thereof. I.e., the document presented herein also considers sequences of different and/or identical commands in a single command phase as one command. Also, it is conceivable to use a data word for several commands, in which for example individual bits can already represent a command. In this case it can be useful if the different bits of the data word of a command represent different commands depending on their logical value.

However, a command and/or subcommand that the ultrasonic sensor receives can also be, for example, a command or subcommand that signals to the ultrasonic sensor that the ultrasonic sensor should not execute the ultrasonic measurement phase, but that the ultrasonic sensor should skip the ultrasonic measurement phase. This command can be useful, for example, if the superordinate computer system does not want to perform a measurement, but only wants to retrieve internal status and/or measurement data or other information from inside the ultrasonic sensor.

However, a command and/or subcommand received by the ultrasonic sensor can also be, for example, a command or subcommand that signals to the ultrasonic sensor that the ultrasonic sensor should not execute the third phase of the ultrasonic measurement cycle. This can be useful, for example, if the ultrasonic sensor combines the measurement data from several ultrasonic measurement cycles to form new data that the superordinate computer system then retrieves from the ultrasonic sensor.

However, a command and/or subcommand received by the ultrasonic sensor can also be, for example, a command or subcommand that signals to the ultrasonic sensor that the ultrasonic sensor is to switch UART communication to a prior art communication protocol for communication between an ultrasonic sensor and the superordinate computer system for a predetermined period of time and/or until a switchback signal occurs in the data communication, and, if necessary to interrupt the UART communication in accordance with the UART protocol for this period of time or until a switch-back signal occurs.

This makes it possible to use other communication protocols in the meantime, which may be more suitable for the current measurement task, at least temporarily.

Preferably, the ultrasonic sensor comprises a timer that resets the UART communication from the prior art communication protocol for communication between an ultrasonic sensor and the superordinate computer system back to the UART communication presented herein after the predetermined time period in the data communication has elapsed and, if necessary, causes the UART data interface of the ultrasonic sensor to resume the UART communication according to the UART protocol after the expiration of this time period.

Preferably, the ultrasonic sensor comprises a control device, in the form of a control logic, which resets the UART communication from the communication protocol for communication between an ultrasonic sensor and the superordinate computer system from the prior art back to the UART communication presented here when certain conditions, such as the end of the ultrasonic measurement cycle in the data communication, are present and, if necessary, causes the UART data interface of the ultrasonic sensor to resume the UART communication in accordance with the UART protocol after this period has elapsed.

Preferably, the ultrasonic sensor emits the ultrasonic burst or signal at the beginning of the ultrasonic measurement phase according to a previously received command and/or subcommand.

Preferably, the ultrasonic sensor then receives a reflected ultrasonic signal or a reflected ultrasonic burst as a received signal in the ultrasonic measurement phase.

Typically, the ultrasonic sensor generates an envelope curve signal from the received signal in the ultrasonic measurement phase.

Preferably, the ultrasonic sensor detects and measures the envelope curve signal in the ultrasonic measurement phase after the ultrasonic burst or ultrasonic signal is emitted and typically determines a measured value sequence in this way. The ultrasonic sensor and/or the superordinate computer system preferably evaluate this measured value sequence.

For example, the ultrasonic sensor can be set up by means of special device parts to determine one or more symbols for one or more detected signal objects with respective associated signal object parameters in the envelope curve signal from the measured value sequence. This allows a very compact transmission of the data from the ultrasonic sensor to the superordinate computer system.

For example, the ultrasonic sensor can be set up to transmit such symbols for detected signal objects and/or the parameters of these signal objects to the superordinate computer system in the third phase of the ultrasonic measurement cycle.

In another variation of the proposal presented herein, the ultrasonic sensor emits said ultrasonic burst or signal at the beginning of the ultrasonic measurement phase according to a previously received command.

Typically, the ultrasonic sensor receives a reflected ultrasonic signal or a reflected ultrasonic burst as a received signal in the ultrasonic measurement phase.

Preferably, the ultrasonic sensor forms an envelope curve signal from the received signal of the ultrasonic transducer of the ultrasonic sensor in the ultrasonic measurement phase.

Preferably, the ultrasonic sensor measures the envelope curve signal in the ultrasonic measurement phase after the ultrasonic burst or ultrasonic signal is emitted and determines measured values of the envelope curve signal in the ultrasonic measurement phase or a corresponding sequence of measured values.

Preferably, the ultrasonic sensor signals the arrival of an echo at the ultrasonic sensor to the superordinate computer system in the ultrasonic measurement phase when the value progression of the envelope curve signal of the ultrasonic sensor crosses the instantaneous value of a threshold curve of the ultrasonic sensor in a first direction. This means that the ultrasonic sensor prefers the arrival of an echo at the ultrasonic sensor to the superordinate computer system in the ultrasonic measurement phase with the next rising and/or falling edge of the UART clock and/or the clock of the signal processing and/or the transmit clock and/or the system clock when the value progression of the envelope curve signal of the ultrasonic sensor crosses or has crossed the instantaneous value of a threshold value curve of the ultrasonic sensor in a first direction between the preceding rising and/or falling edge and this rising and/or falling edge.

Preferably, the ultrasonic sensor signals to the superordinate computer system the temporal end of the arrival of an echo at the ultrasonic sensor in the ultrasonic measurement phase with the next rising and/or falling edge of the UART clock and/or the clock of the signal processing and/or the transmit clock and/or the system clock when the value progression of the envelope curve signal crosses the instantaneous value of a threshold curve in a second direction opposite to the first direction.

Preferably, the ultrasonic sensor signals the arrival of echoes at the ultrasonic sensor to the superordinate computer system in ultrasonic measurement phase synchronously with a system clock of the ultrasonic sensor and/or synchronously with a UART system clock of the UART data interface.

Preferably, the ultrasonic sensor signals diagnostic data, such as HW (hardware) faults of your microelectronic circuit or other device parts of the ultrasonic sensor, and other diagnostic faults of the ultrasonic sensor to the superordinate computer system in the third phase of the ultrasonic measurement cycle.

Preferably, the ultrasonic sensor signals values of up to four echoes (echo height, temporal echo position) determined to the superordinate computer system as data in the third phase of the ultrasonic measurement cycle from the ultrasonic sensor to the superordinate computer system.

As described, the additional synchronization command enables the synchronization of the local clock, the system clock or the UART clock with each other.

The superordinate computer system can use the switch command to switch the protocol appropriately, which can be advantageous in certain usage situations. For example, the UART transmission requires a transmission according to the sequence data bit→data bit→data bit→data bit→ . . . . Data protocols with the sequence 0→date→1→0→date→1 are known from the prior art. For example, it is conceivable that the superordinate computer system can switch the ultrasonic sensor between these data protocol modes by command in the command phase. However, in the course of elaborating the proposal presented here, it became clear that the possibility for such switching is usually not advantageous.

The function of the edges generated in each bit of the prior art method is that the ultrasonic sensor can easily perform a detection of the phase and frequency of the signal of the command data that the superordinate computer system transmits to the ultrasonic sensor in the command phase using these edges, and then track the frequency and phase of the UART clock of the UART data interface of the ultrasonic sensor. Thus, the command phase signal then effectively comprises its carrier frequency.

Since the superordinate computer system synchronizes the UART clock by means of a command in a command phase of an ultrasonic measurement cycle, and since the ultrasonic clock should have sufficient stability of the frequency and phase position of the UART clock of the UART data interface of the ultrasonic sensor, the respective ultrasonic sensor system can dispense with this permanent transmission of edges.

The consequence is an increased data rate, since the rigidly fixed 0 bits and 1 bits become superfluous. The ultrasonic sensor can therefore transmit more information to the superordinate computer system with the same time length of an ultrasonic measurement cycle.

With the same time length of the command phase, the superordinate computer system can transmit more commands to the ultrasonic sensor in the command phase. This also increases the number of possible contents of the commands transmitted in the command phase. The superordinate computer system can signal more different operating modes to the ultrasonic sensor.

In UART mode, the data packets that the superordinate computer system sends to the ultrasonic sensor in the command phase preferably include a start bit, the data and a stop bit, and possibly a parity bit.

Preferably, the superordinate computer system can switch the ultrasonic sensor between a UART mode corresponding to the transmission method set forth herein and a state-of-the-art mode by means of commands in the command phase via the ports of the UART data interface, wherein the state-of-the art mode corresponds to a data interface as known from the prior art.

Thus, the technical teachings disclosed herein in this document describe a UART data line in whose signal path the ultrasonic sensor intermittently inserts the transmission of echo signals, during which phase the UART data transmission is omitted.

Such an ultrasonic sensor allows, at least in some implementations, the efficient transmission of acquired data in a short time. However, the advantages are not limited to this.

It is an extension of the prior art UART communication, so as to improve the efficiency of communication between an ultrasonic sensor and the superordinate computer system without increasing the system cost. The UART mode presented in this document enables a data transfer rate between the ultrasonic sensor and the superordinate computer system that is increased by a factor of 2-3 over the prior art data transfer rate at the same communication speed.

DESCRIPTION

Figure 1:
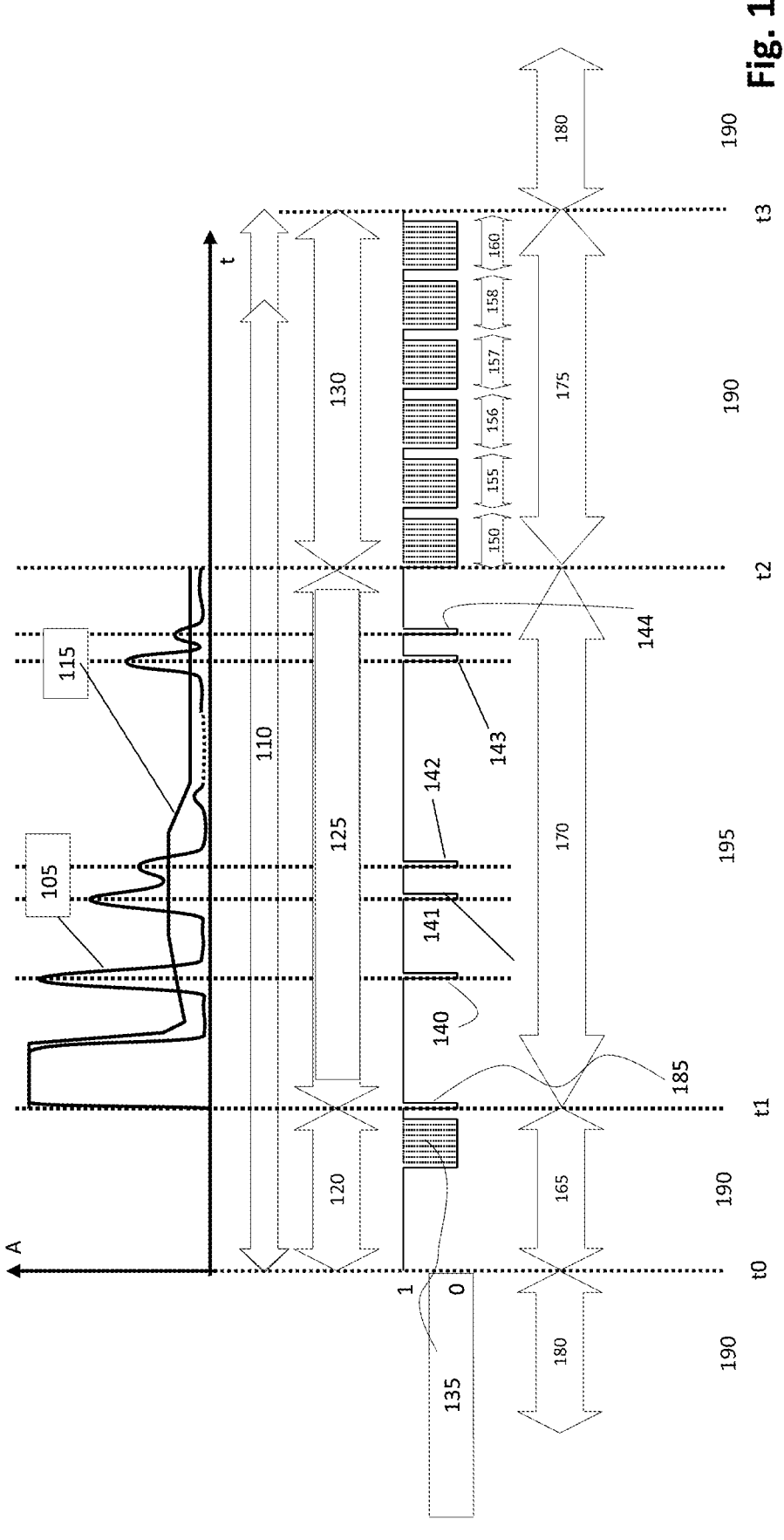
FIG. 1 shows the various phases of an ultrasonic measurement cycle 110 of an ultrasonic sensor 405 and the communication of the ultrasonic sensor 405 and the superordinate computer system 505 via the common UART data interface during this ultrasonic measurement cycle 110.

FIG. 1 illustrates the various phases of an ultrasonic measurement cycle 110 of an ultrasonic sensor 405 and the communication of the ultrasonic sensor 405 and the superordinate computer system 505 via the common UART data interface during this ultrasonic measurement cycle 110.
Communication Via a Separate Transmit and Receive Line (545, 550)

The ultrasonic measurement cycle 110 illustrated herein begins at a time to with the command phase 120. In the command phase 120, the superordinate computer system 505 transmits one or more commands 135 to the ultrasonic sensor 405 using a UART protocol via the UART data interfaces 560 of the superordinate computer system 505 and the UART data interface 430 of the ultrasonic sensor 405.

With respect to exemplary possible commands 135, the description of this figure refers to the above description of such exemplary commands.

The temporal length of the command phase 120 typically depends on the commands that are transmitted. Therefore, the UART data interface 430 of the ultrasonic sensor 405 also observes the content of the commands 135 and predicts the probable end of the command phase 120. Preferably, the commands 135 comprise a flag or a symbol comparable in its function at their temporal end, which indicates whether at least one further command still follows. It is of course conceivable that a command can indicate how many commands still follow and/or how many command bits still follow and/or how many command bytes still follow and/or how many command data words still follow. In addition to this timing control, it is also conceivable that the superordinate computer system 505 may use a specific command 135 in the command phase 120 to end the command phase 120 and thereby start the ultrasonic measurement phase 125. This start of the ultrasonic measurement phase 125 may be delayed with respect to such a command 135 to terminate the command phase 120. A command 135 may comprise one or more command bits and/or comprise one or more command bytes and/or comprise one or more command data words and or comprise multiple commands and/or subcommands. Once the commands 135 are fully received, the command phase 120 preferably ends. If the selected protocol so provides, the time length of the command phase 120 may also be specified in a unit of time—e.g., seconds—or in command bits or the like. In case of doubt, one bit may be assumed for each UART clock of the UART clock 540 of the UART data interface 430 of the ultrasonic sensor 405, for example.

With the start of the ultrasonic measurement phase 125, the UART data interface 430 of the ultrasonic sensor 405 changes from the UART mode 190 to the signal mode 195. In the UART mode 190, the UART data interface 430 of the ultrasonic sensor 405 communicates with the UART data interface 560 of the superordinate computer system 505 by means of the UART protocol. Preferably, the ultrasonic sensor 405 starts a time counter 555 in a defined temporal relationship with the start 185 of the ultrasonic measurement phase 125.

In the example of FIG. 1, if the superordinate computer system 505 does not send any data to the receive input RX of the UART data interface 430 of the ultrasonic sensor 405 by means of its transmit output TX of its UART data interface 560, the receive port RX of the UART data interface 430 of the ultrasonic sensor 405 is at a logical 1. Preferably, a data transmission of the UART data interface 560 of the superordinate computer system 505 to the UART data interface 430 of the ultrasonic sensor 405 starts with a start bit. For this purpose, the transmit output TX of the UART data interface 560 of the superordinate computer system 505 pulls the receive line 545 between the transmit output TX of the UART data interface 560 of the superordinate computer system 505 and the receive input RX of the UART data interface 430 of the ultrasonic sensor 405 to the logical level 0 for the duration of one data bit of the UART clock of the UART data interface 560 of the superordinate computer system 505. Immediately thereafter, the transmission of eight data bits synchronously with said UART clock typically follows. Immediately thereafter, the UART data interface 560 of the superordinate computer system 505 transmits a parity bit for the transmitted data to the UART data interface 430 of the ultrasonic sensor 405. The ultrasonic sensor 405 calculates a second parity bit based on the received data bits and compares said second parity bit to the parity bit received from the superordinate computer system 505. To the extent that the two parity bits are not in the expected relationship (equality or inversion), the ultrasonic sensor 405 concludes that an error has occurred. Typically, the superordinate computer system 505 still transmits a stop bit, which is typically a logic 1.

In command phase 120, the superordinate computer system 505 may also transmit more than one datum to the ultrasonic sensor 405.

With the end of the command phase 120 and the beginning of the ultrasonic measurement phase 125, the transmit output TX of the UART data interface 430 of the ultrasonic sensor 405, as proposed, no longer operates as the UART transmit output TX for the duration of the ultrasonic measurement phase 125. With the end of the command phase 120 and the beginning of the ultrasonic measurement phase 125, the receive input RX of the UART data interface 560 of the superordinate computer system 505 no longer operates as a UART receive input RX for the duration of the ultrasonic measurement phase 125.

It is advantageous if, with the end of the command phase 120 and the beginning of the ultrasonic measurement phase 125, the receive input RX of the UART data interface 430 of the ultrasonic sensor 405 continues to operate as a UART receive input for the duration of the ultrasonic measurement phase 125, as suggested. It is equally advantageous if, with the end of the command phase 120 and the beginning of the ultrasonic measurement phase 125, the transmit output TX of the UART data interface 560 of the superordinate computer system 505 continues to operate as a UART transmit output, as suggested, for the duration of the ultrasonic measurement phase 125. This allows the superordinate computer system 505 to continue to send commands to the ultrasonic sensor 405.

Preferably, in the ultrasonic measurement phase 125, the UART data interface 430 of the ultrasonic sensor 405 outputs start signal 185 via the transmit output TX of the UART data interface 430 of the ultrasonic sensor 405 with the system clock of the ultrasonic sensor 405 and/or with the UART clock 540 of the UART data interface 430 of the ultrasonic sensor 405, which typically signals the start t1 of the ultrasonic measurement phase 125 to the receive input RX of the UART data interface 560 of the superordinate computer system 505. Preferably, in the ultrasonic measurement phase 125, the UART data interface 430 of the ultrasonic sensor 405 outputs signaling (140, 141, 142, 143, 144) via the transmit output TX of the UART data interface 430 of the ultrasonic sensor 405 with the system clock of the ultrasonic sensor 405 and/or with the UART clock 540 of the UART data interface 430 of the ultrasonic sensor 405, which typically signal the arrival of echoes in the form of reflected ultrasonic bursts 520 and/or reflected ultrasonic signals 520 to the receive input RX of the superordinate computer system 505. To do this, the transmit output TX of the UART data interface 430 of the ultrasonic sensor 405 pulls the logic level of the line 550 between the transmit output TX of the UART data interface 430 of the ultrasonic sensor 405 and the receive input RX of the UART data interface 560 of the superordinate computer system 505 to a logic "0" as a "start signal" 185 at the beginning of the ultrasonic measurement phase 125 for the duration of one or fewer periods of the system clock of the ultrasonic sensor or for the duration of one or fewer periods of the UART clock 540 of the UART data interface 430. This signals the ultrasonic sensor 405 to the superordinate computer system 505 that the ultrasonic measurement phase 125 has begun.

Typically, the ultrasonic sensor 405 begins emitting an ultrasonic burst or an ultrasonic signal 510 into the free space in front of the ultrasonic sensor 405 simultaneously with or in a fixed temporal relationship to this signal 185. Objects 515 in the vicinity of the ultrasonic sensor 405 reflect this ultrasonic burst or the emitted ultrasonic signal 510.

It is also conceivable that the ultrasonic sensor 405 does not emit an ultrasonic burst or ultrasonic signal 510 because another ultrasonic sensor 801 of an ultrasonic sensor system 800, of which the superordinate computer system 505 and the ultrasonic sensor 405 are a part, emits this ultrasonic burst or ultrasonic signal 510. Preferably, the superordinate computer system 505 starts the ultrasonic measurement phase 125 by means of a simultaneous command 135 to all ultrasonic sensors (405, 801, 802, 803) of its ultrasonic measurement system 800 at all ultrasonic sensors (405, 801, 802, 803) participating in the measurement simultaneously, wherein preferably only one ultrasonic sensor 801 of the ultrasonic sensors (405, 801, 802, 803) of the ultrasonic measurement system 800 emits an ultrasonic burst or an ultrasonic signal 510. For simplicity, we assume that all of the ultrasonic sensors (405, 801, 802, 803) of its ultrasonic measurement system 800 are substantially similar in design to the ultrasonic sensor 405 without limiting the disclosure herein.

The ultrasonic measurement phase 125 is typically divided sequentially in time into an outgoing phase, a transmitting phase and a decaying phase (together 610), and a receiving phase—also referred to as the measurement phase 615.

In the transmitting phase, the transmitting ultrasonic sensor 801 transmits the ultrasonic burst or the ultrasonic signal 510 into the free space in the vicinity of the transmitting ultrasonic sensor 801. For the transmitting ultrasonic sensor 801, the decay phase then follows in which the mechanical oscillating element of the transmitting ultrasonic sensor 801 decays and in which the transmitting ultrasonic sensor 801 typically brakes the oscillating element of the transmitting ultrasonic sensor 801. Only then follows the receiving phase 615 until the end of the ultrasonic measurement phase 125 in which the ultrasonic sensor 405 receives the reflections of the ultrasonic burst or the ultrasonic signal 510 as echoes in a reflected ultrasonic signal 520.

The non-emitting ultrasonic sensors (405, 802, 803) typically do not go through a transmitting phase and a decaying phase (together 610) during the ultrasonic measurement phase 125, but only a receiving phase 615.

Preferably, the emitting ultrasonic sensor 801 ignores the received signal 470 as long as its oscillating element has not yet swung out and it is in the transmitting phase or swing-out phase (together 610).

The ultrasonic sensors (405, 801, 802, 803) of the ultrasonic system 800 form from the respective received signals 470 of their ultrasonic receivers or ultrasonic transducers 465 in respective envelope curve signal 105, which typically reflects the time course of the amplitude of the received reflected ultrasonic signal 520. An I/Q split of the respective received signal 470 is conceivable and typically useful in the receive path of each ultrasonic sensor 405, 801 to 803.

The ultrasonic sensors (405, 801, 802, 803) of the ultrasonic system 800 preferably compare the amplitude of their respective envelope curve signal 105 with the instantaneous value of a predetermined and/or calculated and/or adjusted respective threshold curve 115 of the respective ultrasonic sensor of the ultrasonic sensors (405, 801, 802, 803) of the ultrasonic system 800 in the receiving phase 615 of the ultrasonic measurement phase 125.

If the instantaneous value of the respective envelope curve signal 105 exceeds the current value of the respective threshold curve 115, the connection of the UART data interface 430 of the ultrasonic sensor 405 to the single-wire data bus 500 pulls the connection of the UART data interface 430 of the ultrasonic sensor 405 to the single-wire bus 500 to a logic "0" with the next edge and/or the next rising edge and/or the next falling edge of the system clock or the UART clock 540. If the instantaneous value of the envelope curve signal 105 falls below the current value of the threshold curve 115, the output of the UART data interface 430 of the ultrasonic sensor 405 to the single-wire data bus 500 pulls, with the next edge and/or the next rising edge and/or the next falling edge of the system clock or the UART clock, the connection of the UART data interface 430 to the single-wire data bus 500 and thus pulls the single-wire data bus 500 to a logic "1," if no other bus node pulls the single-wire data bus 500 to a logical "0."

Instead of this threshold curve 115 controlled signaling, signaling of maxima in the envelope curve signal 105 is also conceivable. For this purpose, the ultrasonic sensor 405 preferably filters its envelope curve signal 105 by means of the analog portion 475 of the ultrasonic reception path of the ultrasonic sensor 405 and/or by means of the digital portion 485 of the ultrasonic reception path of the ultrasonic sensor 405, preferably in order to remove noise and other artifacts. Now, if the ultrasonic sensor 405 detects a maximum in the timing of its envelope curve signal 105, connection of the UART data interface 430 of the ultrasonic sensor 405 to the single-wire data bus 500 pulls the connection of the UART data interface 430 of the ultrasonic sensor 405 to the single-wire data bus 500 to a logic "0" for a predefined and/or set and/or programmed time with the next edge and/or the next rising edge and/or the next falling edge of the system clock or the UART clock 540. For example, the predefined time may be the temporal duration of a system clock of the ultrasonic sensor 405 and/or the temporal duration of a UART clock 540 and/or the temporal duration of a predetermined number of system clocks of the ultrasonic sensor 405 and/or a temporal duration of a predetermined number of UART clocks of the UART clock 540 of the UART data interface 430 of the ultrasonic sensor 405. The present disclosure also refers to this predefined time hereinafter as the signaling duration.

FIG. 1 illustrates the detection and signaling of a first echo 140 using the example of a maximum detection of a maximum in the value of the envelope curve signal 105 of the ultrasonic sensor 405. Preferably, the ultrasonic sensor 405 stores a first count of the time counter 555 of the ultrasonic sensor 405 as a first echo time marker of the first echo 140. Preferably, the ultrasonic sensor 405 temporarily stores a first envelope amplitude value of the envelope curve signal 105 as the first echo amplitude of the first echo 140.

FIG. 1 illustrates the detection and signaling of a second echo 141 using the example of a maximum detection of a maximum in the value of the envelope curve signal 105 of the ultrasonic sensor 405. Preferably, the ultrasonic sensor 405 stores a second count of the time counter 555 of the ultrasonic sensor 405 as a second echo time marker of the second echo 141. Preferably, the ultrasonic sensor 405 temporarily stores a second envelope amplitude value of the envelope curve signal 105 as a second echo amplitude of the second echo 141.

FIG. 1 illustrates the detection and signaling of a third echo as an "Echo3 signal" using the example of a maximum detection of a maximum in the envelope curve signal 105 value waveform of the ultrasonic sensor 405. Preferably, the ultrasonic sensor 405 stores a third count of the time counter 555 of the ultrasonic sensor 405 as a third echo time marker of the third echo 142. Preferably, the ultrasonic sensor 405 temporarily stores a third envelope amplitude value of the envelope curve single 105 as the third echo amplitude of the third echo 142.

FIG. 1 illustrates the detection and signaling of a fourth echo as an "echo4 signal" using the example of a maximum detection of a maximum in the envelope curve signal 105 value of the ultrasonic sensor 405. Preferably, the ultrasonic sensor 405 latches a fourth counter value of the time counter 555 of the ultrasonic sensor 405 as a fourth echo time marker of the fourth echo 143. Preferably, the ultrasonic sensor 405 temporarily stores a fourth envelope amplitude value of the envelope curve signal 105 as the fourth echo amplitude of the fourth echo 143.

FIG. 1 illustrates the detection and signaling of a fifth echo 144 using the example of a maximum detection of a maximum amplitude value in the envelope curve signal 105 of the ultrasonic sensor 405. Where useful, the ultrasonic sensor 405 stores a fifth counter value of the ultrasonic sensor time counter 555 as a fifth echo time marker of the fifth echo 144. Where useful, the ultrasonic sensor 405 temporarily stores a fifth envelope amplitude value of the envelope curve signal 105 as a fifth echo amplitude of the fifth echo 144.

It has been shown that for many applications, storing the measured value of the first four echoes (140 to 143) is sufficient.

Preferably, the temporal duration of the ultrasonic measurement phase 125 is determined by design or by setting or by programming or by means of a command 135 of the command phase 120.

Also, the ultrasonic sensor 405 may infer an end of the ultrasonic measurement phase 125 when it has not detected an echo for a predetermined and/or set and/or programmed amount of time. Among other things, the ultrasonic sensor 405 may use the time counter 555 and/or another time counter to determine this duration.

Preferably, the superordinate computer system 505 uses appropriate commands 135 in the command phase 120 to ensure that all ultrasonic sensors (405, 801, 802, 803) have exited the ultrasonic measurement phase 125 before the start of the next, temporally subsequent ultrasonic measurement cycle 110.

With the end of the ultrasonic measurement phase 125, the third phase 130 of the ultrasonic measurement cycle 110 preferably begins for the ultrasonic sensor 405. In the third phase 130 of the ultrasonic measurement cycle 110, the ultrasonic sensor 405 transmits data (150, 155, 156, 157, 158, 160) such as measurement, control and/or diagnostic data via the transmit port TX of its UART data interface 430, for example, evaluation results and/or measurement, control and/or diagnostic data to the receive input RX of the UART data interface 560 of the superordinate computer system 505. Preferably, the ultrasonic sensor 405 first transmits status information 150 in the form of one or more status bits or status bytes.

The document presented herein proposes that the ultrasonic sensor 405 thereafter transmits, via its UART data interface 430, the measured values of the detected echoes (140, 141, 142, 143, 144) previously buffered in the ultrasonic measurement phase 125.

The document presented herein proposes that the ultrasonic sensor 405 transmits, via its UART data interface 430, after the end of the ultrasonic measurement phase 125, the measured values of the first four detected echoes (140, 141, 142, 143) previously buffered in the ultrasonic measurement phase 125, since it was recognized during the elaboration of the technical teachings presented herein that the evaluation of these first four echoes (140, 141, 142, 143) is usually sufficient for most applications.

To this end, the ultrasonic sensor 405 may next transmit the number of detected echoes (140 to 144) to the superordinate computer system 505, which allows the superordinate computer system 505 to identify how much echo data follows in this third phase 130 of the ultrasonic measurement cycle 110.

As described above, typically when the start signal 185 is transmitted from the ultrasonic sensor 405 to the superordinate computer system 505, the ultrasonic sensor 405 starts said time counter 555 of the ultrasonic sensor 405, which counts, for example, the system clock of the ultrasonic sensor 405 or a clock derived therefrom. Thus, a one-to-one time stamp is available to the ultrasonic sensor for each event that occurs in the ultrasonic measurement phase 125, which the ultrasonic sensor 405 can preferably cache with the parameters of the event, which may typically include the type of event, for transmission to the superordinate computer system 505 in the third phase 130 of the ultrasonic measurement cycle 110. Transmission of such time stamps is not necessary if the superordinate computer system in the ultrasonic measurement phase records the time between the start signal 185 of the ultrasonic measurement phase or the start signal 625 of the actual measurement phase and the occurrence of the signaling pulse of an echo (140 to 144), thus generating its own time stamp. Furthermore, due to the start signal 185 and the immediate signaling of an echo (140 to 144), the superordinate computer system 505 can not only generate its own time stamp for each signaling of an echo (140 to 144), but also thus analyze and process the early-occurring echoes at an early stage, even though the ultrasonic measurement phase 125 has not yet ended. This is of particular importance in safety-related applications, since echoes 140 arriving early after start 185 correspond to very close objects 515, which are accordingly generally more dangerous and may require a rapid response.

Preferably, in the third phase 130 of the ultrasonic measurement cycle 110, the ultrasonic sensor 405 transmits the measured values of the echo 140 that occurred first in terms of time to the receive port RX of the UART data interface 560 of the superordinate computer system 505 via the transmit port TX of its UART data interface 430. These measured values of the first echo 140 can be, for example, the time (=counter reading of the time counter 555 of the ultrasonic sensor 405) at which the ultrasonic sensor 405 determined a first-time exceeding of the threshold curve 115 by the envelope curve signal 105 in the ultrasonic measurement phase 125 and/or the time (=counter reading of the time counter 555 of the ultrasonic sensor 405) at which the ultrasonic sensor 405 has determined a first occurrence of a maximum of the envelope curve signal 105 above the threshold value curve 115 in the ultrasonic measurement phase 125.

Preferably, the ultrasonic sensor 405 subsequently transmits the measured values of the echo 141 that occurred second in time to the receive port RX of the UART data interface 560 of the superordinate computer system 505 via the transmit port TX of its UART data interface 430. These measured values of the second echo 141 can be, for example, the time (=counter reading of the time counter 555 of the ultrasonic sensor 405) at which the ultrasonic sensor 405 determined a second exceeding of the threshold curve 115 by the envelope curve signal 105 in the ultrasonic measurement phase 125 and/or the time (=counter reading of the time counter 555 of the ultrasonic sensor 405) at which the ultrasonic sensor 405 has determined a second occurrence of a maximum of the envelope curve signal 105 above the threshold value curve 115 in the ultrasonic measurement phase 125.

Preferably, the ultrasonic sensor 405 then transmits the measured values of the echo 142 that occurred in time as the third echo to the receive port RX of the UART data interface 560 of the superordinate computer system 505 via the transmit port TX of its UART data interface 430. These measured values of the third echo 142 can be, for example, the time (=counter reading of the time counter 555 of the ultrasonic sensor 405) at which the ultrasonic sensor 405 determined a third crossing of the threshold curve 115 by the envelope curve signal 105 in the ultrasonic measurement phase 125 and/or the time (=counter reading of the time counter 555 of the ultrasonic sensor 405) at which the ultrasonic sensor 405 has determined a third occurrence of a maximum of the envelope curve signal 105 above the threshold value curve 115 in the ultrasonic measurement phase 125.

Preferably, the ultrasonic sensor 405 then transmits the measured values of the echo 143 that occurred in time as the fourth echo to the receive port RX of the UART data interface 560 of the superordinate computer system 505 via the transmit port TX of its UART data interface 430. These measured values of the fourth echo 143 can be, for example, the time (=counter reading of the time counter 555 of the ultrasonic sensor 405) at which the ultrasonic sensor 405 determined a fourth crossing of the threshold curve 115 by the envelope curve signal 105 in the ultrasonic measurement phase 125 and/or the time (=counter reading of the time counter 555 of the ultrasonic sensor 405) at which the ultrasonic sensor 405 has determined a fourth occurrence of a maximum of the envelope curve signal 105 above the threshold value curve 115 in the ultrasonic measurement phase 125.

Although the ultrasonic sensor can continue this transmission in an analogous manner for any number of echoes, it has been shown that the transmission of further echoes generally no longer provides any significant gain in information and only leads to an increase in the time duration of the ultrasonic measurement phase 125 and the time duration of the third phase 130 of the ultrasonic measurement cycle 110, which in turn reduces the frequency of the successive ultrasonic measurements in the form of successive ultrasonic measurement cycles 110 of the ultrasonic sensor 405. This in turn is then detrimental to the safety of the vehicle and its occupants when too many echoes are transmitted.

Preferably, a transmission of one or more pieces of check information 160, for example in the form of a checksum, for example in the form of one or more CRC bytes, completes the data transmission from the ultrasonic sensor 405 via the transmit port TX of the UART data interface 430 of the ultrasonic sensor 405 to the receive port RX of the UART data interface 560 of the superordinate computer system 505, thereby completing the third phase 130 of the ultrasonic measurement cycle 110.

Thus, at the earliest, the third phase 130 of the ultrasonic measurement cycle 110 ends with the completion of the transmission of the last data. i.e., the last bit. One way to ensure that the superordinate computer system 505 detects the end of the third phase 130 of the ultrasonic measurement cycle 110 may be, first, at the beginning of the data transmission at the beginning of the third phase 130 of the ultrasonic measurement cycle 110, the ultrasonic sensor 405 sends an information about the maximum time length of the third phase 130 of the ultrasonic measurement cycle 110 ends to the superordinate computer system 505 and/or second, at the end of the data transmission in the third phase 130 of the ultrasonic measurement cycle 110, the ultrasonic sensor 405 sends a data end code to the superordinate computer system 505 that enables the superordinate computer system 505 to detect or calculate the end of the data transmission. Preferably, the ultrasonic sensor 405 sends such an end-of-data code namely before the check information 160 that allows the superordinate computer system 505 to verify the correct reception of the data in the third phase 130 of the ultrasonic measurement cycle 110. Thus, the superordinate computer system 505 may still need to take this time into account when calculating the end of the ultrasonic measurement cycle 110.

At the end of the third phase 130 of the ultrasonic measurement cycle 110, the UART data interface 560 of the superordinate computer system 505 preferably switches back to a state corresponding to the command phase 120 and/or an equivalent state.

Communication Via a Single Data Line

In addition to communication via two data lines (545, 550), communication via a single data line is also possible.

After the ultrasonic sensor system 400 is powered up or reset, the UART data interface 430 of the ultrasonic sensor 405 is in the UART receive state. The UART data interface 560 of the superordinate computer system 505 is then in the UART transmit state. Preferably, the UART data interface 430 of the ultrasonic sensor 405 is configured to allow a logical 0 of the UART data interface 560 of the superordinate computer system 505 to override a logical 1 that the UART data interface 430 of the ultrasonic sensor 405 wishes to place on the single-wire data bus 500. Preferably, the UART data interface 560 of the superordinate computer system 505 is configured such that a logical 0 of the UART data interface 430 of the ultrasonic sensor 405 can overwrite a logical 1 that the UART data interface 560 of the superordinate computer system 505 wishes to place on the single-wire data bus 500.

Preferably, the UART data interface 430 of the ultrasonic sensor 405 observes the data on the single-wire data bus 500. If the UART data interface 430 of the ultrasonic sensor 405 wants to write a logical 1 to the single-wire data bus 500 and then the UART data interface 430 of the ultrasonic sensor 405 detects a 0 on the single-wire data bus 500, the UART data interface 430 of the ultrasonic sensor 403 typically assumes a bus collision. Preferably, the UART data interface 430 of the ultrasonic sensor 405 then transitions to the receive state of the UART data interface 430 of the ultrasonic sensor 405.

In the command phase, the UART data interface 560 of the superordinate computer system 505 is typically in the transmit state of the UART data interface 560 of the superordinate computer system 505.

In the command phase, the UART data interface 430 of the ultrasonic sensor 405 is typically in the receive state of the UART data interface 430 of the ultrasonic sensor 405.

In the ultrasonic measurement phase 125, the UART data interface 560 of the superordinate computer system 505 is typically in the receive state of the UART data interface 560 of the superordinate computer system 505.

In the ultrasonic measurement phase 125, the UART data interface 430 of the ultrasonic sensor 405 is typically in the transmit state of the UART data interface 430 of the ultrasonic sensor 405.

In the third phase 130 of the ultrasonic measurement cycle 110, the UART data interface 560 of the superordinate computer system 505 is typically in the receive state of the UART data interface 560 of the superordinate computer system 505.

In the third phase 130 of the ultrasonic measurement cycle 110, the UART data interface 430 of the ultrasonic sensor 405 is typically in the transmit state of the UART data interface 430 of the ultrasonic sensor 405.

Therefore, the ultrasonic sensor system 400 must ensure that the UART data interface 560 of the superordinate computer system 505 changes from the transmit state to the receive state when changing from the command phase 120 to the ultrasonic measurement phase 125.

In addition, the ultrasonic sensor system 400 must ensure that the UART data interface 430 of the ultrasonic sensor 405 changes from the receive state to the transmit state when changing from the command phase 120 to the ultrasonic measurement phase 125.

Further, the ultrasonic sensor system 400 must ensure that the UART data interface 560 of the superordinate computer system 505 changes back from the receive state to the transmit state when changing from the third phase 130 of the ultrasonic measurement cycle 110 to the command phase 120.

In addition, the ultrasonic sensor system 400 must ensure that the UART data interface 430 of the ultrasonic sensor 405 changes from the transmit state to the receive state when changing from the third phase 130 of the ultrasonic measurement cycle 110 to the command phase 120.

To this end, the document presented herein proposes that the last command 135 from the superordinate computer system 505 to the ultrasonic sensor 405 at the temporal end of the command phase 120 is a command to change to the ultrasonic measurement phase 125 for the ultrasonic sensor 405. After receiving this command 135, the ultrasonic sensor 405 changes to the ultrasonic measurement phase 125. Preferably, there is a waiting time between the reception of the command 135 for the state change and start of the ultrasonic measurement phase 125 on the one hand and this state change on the other hand, which may be predetermined, set or programmed. The time length may be 0s, but this is not preferred. Preferably, a time counter 555 in the ultrasonic sensor 405 controls this waiting time. Preferably, in the ultrasonic measurement phase 125, the UART data interface 430 of the ultrasonic sensor 405 outputs signal 185 to the single-wire data bus 500 via the transmit output TX of the UART data interface 430 of the ultrasonic sensor 405 using the system clock of the ultrasonic sensor 405 and/or the UART clock 540 of the UART data interface 430 of the ultrasonic sensor 405, which typically signals the start 185 of the ultrasonic measurement phase 125 to the receive input TX of the UART data interface 560 of the superordinate computer system 505. Preferably, during the ultrasonic measurement phase 125, the UART data interface 430 of the ultrasonic sensor 405 outputs signaling (140 to 144) to the single-wire data bus 500 via the transmit output TX of the UART data interface 430 of the ultrasonic sensor 405 using the system clock of the ultrasonic sensor 405 and/or the UART clock 540 of the UART data interface 430 of the ultrasonic sensor 405, typically signaling the arrival of echoes (140 to 144) in the form of reflected ultrasonic bursts and/or reflected ultrasonic signals 520 to the receive input TX of the UART data interface 560 of the superordinate computer system 505. For this purpose, the connection of the UART data interface 430 of the ultrasonic sensor 405 to the single-wire data bus 500 pulls the logic level of the single-wire data bus 500 between the UART data interface 430 port of the ultrasonic sensor 405 and the corresponding UART data interface 560 port of the superordinate computer system 505 to a logic "0," as a "start signal" 185 at the beginning of the ultrasonic measurement phase 125, for the duration of one or fewer periods of the system clock of the ultrasonic sensor 405 or for the duration of one or fewer periods of the UART clock 540 of the UART data interface 430. This allows the ultrasonic sensor 405 to the superordinate computer system 505 that the ultrasonic measurement phase 125 has begun.

In the event that the UART data interface 430 of the ultrasonic sensor 405 detects a bus collision after such signaling in the ultrasonic measurement phase 125 at any time, the document presented herein suggests that the ultrasonic sensor 405 then exits the ultrasonic measurement phase 125 and reverts to the command phase 120. In such an error condition, the state of the UART data interface 430 of the ultrasonic sensor 405 then switches back to the receive state in accordance with the suggestions.

Thus, via its UART data interface 560, the superordinate computer system 505 detects the start of the ultrasonic measurement phase 125 of the ultrasonic sensor 405 and, if necessary, starts a time counter of the superordinate computer system 505 to detect propagation times of reflections of the ultrasonic burst 510 emitted by the ultrasonic sensor 405 or the ultrasonic signal 510 emitted by the ultrasonic sensor 405.

Typically, in the absence of a bus collision, the ultrasonic sensor 405 begins emitting an ultrasonic burst or an ultrasonic signal 510 into the free space in front of the ultrasonic sensor 405 simultaneously with or in a fixed temporal relationship to this start signaling 185 of the UART data interface 430 of the ultrasonic sensor 405. Objects 515 in the vicinity of the ultrasonic sensor 405 reflect this ultrasonic burst 510 or the emitted ultrasonic signal 510 as a reflected ultrasonic burst 520 or reflected ultrasonic signal 520.

It is also conceivable that the ultrasonic sensor 405 does not emit an ultrasonic burst or ultrasonic signal 510 because another ultrasonic sensor of the ultrasonic sensors (405, 801 to 803) of an ultrasonic sensor system 800, of which the superordinate computer system 505 and the ultrasonic sensor 405 are a part, emits this ultrasonic burst or ultrasonic signal 510. Preferably, the superordinate computer system 505 starts the ultrasonic measurement phase 125 by means of a simultaneous command 136 to all ultrasonic sensors (405, 801 to 803) of its ultrasonic measurement system (800) at all ultrasonic sensors (405, 801 to 803) participating in the measurement simultaneously, whereby preferably only one of the ultrasonic sensors 801 of the ultrasonic measurement system 800 emits an ultrasonic burst or an ultrasonic signal 510. For simplicity, the document provided herein assumes that all of the ultrasonic sensors (405, 801 to 803) of the ultrasonic sensing system 800 are constructed in the same manner, without limiting the technical teachings disclosed herein thereto.

The ultrasonic measurement phase 125 is typically divided sequentially in time into a transmitting phase, a decaying phase (together 610), and a receiving phase 615.

In the transmitting phase, the transmitting ultrasonic sensor 801 transmits the ultrasonic burst or the ultrasonic signal 510 into the free space in the vicinity of the transmitting ultrasonic sensor 801. For the transmitting ultrasonic sensor 801, the decay phase then follows in which the mechanical vibrating element decays and in which the transmitting ultrasonic sensor 801 typically brakes the vibrating element. Only then does the receiving phase 615 follow for the emitting ultrasonic sensor 801 until the end of the ultrasonic measurement phase 125 in which the emitting ultrasonic sensor 801 receives the reflected ultrasonic burst 520 or the reflected ultrasonic signal 520 as echoes.

The non-emitting ultrasonic sensors (405, 802, 803) typically do not go through a transmitting phase and a decaying phase during the ultrasonic measurement phase 125, but only a receiving phase 615.

Preferably, the emitting ultrasonic sensor 801 ignores the received signal 470 as long as its oscillating element has not yet swung out and it is in the transmitting phase or swing-out phase.

The ultrasonic sensors (405, 801 to 803) of the ultrasonic system 800 form a respective envelope curve signal 105 from the respective received signals 470 of their ultrasonic receivers or ultrasonic transducers 465, which typically reflects the time course of the respective amplitude of the respective received reflected ultrasonic signal 520.

The ultrasonic sensors (405, 801 to 803) each compare the respective amplitude of their respective envelope curve signal 105 with the instantaneous value of a predetermined and/or calculated and/or set respective threshold curve 115 of the respective ultrasonic sensor of the ultrasonic sensors (405, 801 to 803) in the receiving phase 615 of the ultrasonic measurement phase 125.

If the instantaneous value of the envelope curve signal 105 exceeds the current value of the threshold curve 115, the connection of the UART data interface 430 of the ultrasonic sensor 405 to the single wire data bus 500 pulls the connection of the UART data interface 430 to the single wire data bus 500 with the next edge and/or the next rising edge and/or the next falling edge of the system clock or the UART clock 540 of the ultrasonic sensor 405, and thus pulls the single wire data bus 500 to a logic "0". If the instantaneous value of the envelope curve signal 105 falls below the current value of the threshold curve 115, the output of the UART data interface 430 of the ultrasonic sensor 405 to the single-wire data bus 500 pulls up with the next edge and/or the next rising edge and/or the next falling edge of the system clock or of the UART clock 540 pulls the connection of the UART data interface 430 to the single-wire data bus 500, and thus pulls the single-wire data bus 500 to a logic "1" if no other bus node pulls the single-wire data bus 500 to a logic "0".

Instead of this threshold curve 115 controlled signaling, signaling of maxima is also conceivable. For this purpose, the ultrasonic sensor 405 filters its envelope curve signal 105, preferably to remove noise and other artifacts. If the ultrasonic sensor 405 now detects a maximum in the time history of its envelope curve signal 105, the connection of the UART data interface 430 of the ultrasonic sensor 405 to the single wire data bus 500 pulls the single wire data bus 500 with the next edge and/or the next rising edge and/or the next falling edge of the system clock and/or of the UART clock 540 the connection of the UART data interface 430 of the ultrasonic sensor 405 to the single wire data bus 500, and thus the single wire data bus 500 to a logic "0" for a predefined and/or set and/or programmed time. For example, the predefined time may be the temporal duration of a system clock of the ultrasonic sensor 405 and/or the temporal duration of a UART clock 540 of the UART data interface 430 of the ultrasonic sensor 405 and/or the temporal duration of a predetermined number of system clocks of the ultrasonic sensor 405 and/or the temporal duration of a predetermined number of UART clocks 540 of the UART data interface 430 of the ultrasonic sensor 405. The present disclosure also refers to this predefined time hereinafter as the signaling duration.

FIG. 1 illustrates the detection and signaling of a first echo 140 using a maximum detection as an example. Preferably, the ultrasonic sensor 405 stores a first count of the time counter 555 of the ultrasonic sensor 405 as a first echo time marker of the first echo 140. Preferably, the ultrasonic sensor 405 temporarily stores a first envelope amplitude value of the envelope amplitude 101 as the first echo amplitude of the first echo 140.

FIG. 1 illustrates the detection and signaling of a second echo 141 using a maximum detection as an example. Preferably, the ultrasonic sensor 405 stores a second count of the time counter 555 of the ultrasonic sensor 405 as a second echo time stamp of the second echo 141. Preferably, the ultrasonic sensor 405 temporarily stores a second envelope amplitude value of the envelope curve signal 105 as a second echo amplitude of the second echo 141.

FIG. 1 illustrates the detection and signaling of a third echo 142 using a maximum detection as an example. Preferably, the ultrasonic sensor 405 stores a third count of the time counter 555 of the ultrasonic sensor 405 as a third echo time marker of the third echo 142. Preferably, the ultrasonic sensor 405 temporarily stores a third envelope amplitude value of the envelope curve signal 105 as the third echo amplitude of the third echo 142.

FIG. 1 illustrates the detection and signaling of a fourth echo as 143 using a maximum detection as an example. Preferably, the ultrasonic sensor 405 stores a fourth count of the time counter 555 of the ultrasonic sensor as the fourth echo time marker of the fourth echo 143. Preferably, the ultrasonic sensor 405 temporarily stores a fourth envelope amplitude value of the envelope curve signal 105 as the fourth echo amplitude of the fourth echo 143.

FIG. 1 illustrates the detection and signaling of a fifth echo 144 using a maximum detection as an example. Where useful, the ultrasonic sensor 405 stores a fifth count of the ultrasonic sensor time counter 555 as a fifth echo time tag of the fifth echo 144. Where useful, the ultrasonic sensor 405 temporarily stores a fifth envelope amplitude value of the envelope curve signal 105 as a fifth echo amplitude of the fifth echo 144.

It has been shown that for many applications, storing the measured value of the first four echoes (140 to 143) is sufficient.

Preferably, the temporal duration of the ultrasonic measurement phase 125 is determined by design or by setting or by programming or by means of a command 135 from the superordinate computer system 505 in the command phase 120.

Also, the ultrasonic sensor 405 may infer an end of the ultrasonic measurement phase 125 when it has not detected an echo for a predetermined and/or set and/or programmed period of time.

Preferably, the superordinate computer system 505 ensures that all ultrasonic sensors (405, 801 to 803) have exited the ultrasonic measurement phase 125 before the start of the next ultrasonic measurement cycle 110 by issuing suitable commands 135 in the command phase 120.

Preferably, the UART data interface 560 of the superordinate computer system 505 is capable, in particular cases, of placing a logical "1" on the single-wire data bus 500 that overwrites a logical "0" of the UART data interface 430 of an ultrasonic sensor 405. Preferably, the UART data interfaces 430 of the ultrasonic sensors 405 verify that each logical "0" placed on the bus 500 also appears there as a logical "0". If the UART data interfaces 430 of the ultrasonic sensors 405 detect such a bus collision because the UART data interface 430 of the ultrasonic sensor 405 detects a logical "1" on the single-wire data bus 500 even though it has written in and therefore expected a logical "0", the UART data interface 430 preferably assumes a bus collision. The document provided herein suggests that the ultrasonic sensor 405 then transitions back to the command phase 120, and the UART data interface 430 of the ultrasonic sensor 405 transitions back to the receive state. The UART data interface 560 of the superordinate computer system 505 or another sub-device of the ultrasonic sensor system 400, 800 (e.g., a pull-up bus resistor), when not imprinting a logical "0" on the single-wire data bus 500, imprint a logical "1" on the single-wire data bus 500, which other bus users can overwrite with a logical "0" if needed. Only in said special cases, for example, when the superordinate computer system 505 wants to reset the states of all bus participants and ultrasonic sensors (405, 801 to 803) on the single-wire data bus 500, it is proposed that the superordinate computer system 505 can then imprint a logical "1" that the other bus participants and ultrasonic participants on the single-wire data bus 500 cannot overwrite with their UART data interfaces 430.

The method disclosed herein allows for high-speed communication, and thus the use of additional information to secure data communication between the ultrasonic sensor 405 and the superordinate computer system 505. Additional bits to secure the communication speed are therefore available. Due to the timing advantage of UART mode 190, additional bits can be added without increasing the communication time compared to prior art methods for communication between ultrasonic sensor 405 and superordinate computer system 505. In addition, the communication between the ultrasonic sensor 405 and the superordinate computer system 505 becomes more robust, or the ultrasonic sensor 405 and the superordinate computer system 505 can detect errors during communication. Therefore, the superordinate computer system 505 and the ultrasonic sensor can also better handle and contain such errors.

For the start command or the command 135 for configuring the ultrasonic sensor 405, an additional parity bit is useful here for protection.

One possibility for the exemplary design of an exemplary command 135 of command phase 120 is to use a one-byte command in which the 8 bits of the one-byte command 135 are divided into 3 bits for the command (e.g., start of a measurement or configuration of the ultrasonic sensor 405) and another 4 bits for the configuration of the command (e.g., which measurement profile) and a parity bit for security. The ultrasonic sensor 405 checks the parity bit of the received command 135 and executes the command 135 only if the parity corresponds to the parity bit expected according to the other received bits of the command 135.

The status and echo information (150, 155 to 158, 160), as well as other sensor configuration data, can be secured by means of CRC check information 160.

The method proposed here preferably uses an 8-bit CRC so that the CRC checksum is exactly as long as the individual 8-bit UART data packets of the UART data protocol.

With the end of the ultrasonic measurement phase 125, the third phase 130 of the ultrasonic measurement cycle 110 preferably begins again even when a single-wire data bus 500 is used. In the third phase 130 of the ultrasonic measurement cycle 110, the UART data interface 560 of the superordinate computer system 505 is typically in the receive state and the UART data interface 430 of the ultrasonic sensor 405 is in the transmit state. The UART data interface 560 of the superordinate computer system 505 and the UART data interface 430 of the ultrasonic sensor 405 typically exchange data at least secondarily preferentially according to the UART protocol during the third phase 130 of the ultrasonic measurement cycle 110.

In the third phase 130 of the ultrasonic measurement cycle 110, the ultrasonic sensor 405 transmits evaluation results and/or measurement, control, and/or diagnostic data to the single-wire data bus port of the UART data interface 560 of the superordinate computer system 505 via the single-wire data bus 500 in the UART protocol. Preferably, the ultrasonic sensor 405 first transmits status information 150 in the form of one or more status bits or status bytes via the single wire data bus 500.

The document presented herein proposes that the ultrasonic sensor 405 transmits, via its UART data interface 430, thereafter the measured values of the detected echoes (140 to 144) previously buffered in the ultrasonic measurement phase 125. The document presented herein further proposes that the ultrasonic sensor 405 transmits, via its UART data interface 430, thereafter the measured values of the first four echoes (140 to 143) detected in the ultrasonic measurement phase 125 previously buffered in the ultrasonic measurement phase 125.

To this end, the ultrasonic sensor 405 may next transmit the number of detected echoes (140 to 144) to the superordinate computer system 505, which allows the superordinate computer system 505 to identify how much echo data follows in the third phase 130 of the ultrasonic measurement cycle 110.

As described above, typically when the ultrasonic sensor 405 transmits the start signal 185 from the ultrasonic sensor 405 to the superordinate computer system 505, the ultrasonic sensor 405 starts said time counter 555, which counts, for example, the system clock of the ultrasonic sensor 405 or a clock derived therefrom. Thus, a one-to-one time stamp is available to the ultrasonic sensor 405 for each event that occurs in the ultrasonic measurement phase 125, which the ultrasonic sensor 405 can preferably cache with the parameters of the event, which may typically include the type of event, for transmission to the superordinate computer system 505 in the third phase 130 of the ultrasonic measurement cycle 110.

Preferably, the ultrasonic sensor 405 transmits the measured values of the echo 140 that occurred first in terms of time to the receive port RX of the UART data interface 560 of the superordinate computer system 505 via the transmit port TX of its UART data interface 430. These measured values of the first echo 140 can be, for example, the time (=counter reading of the time counter 555 of the ultrasonic sensor 405) at which the ultrasonic sensor 405 determined a first-time exceeding of the threshold curve 115 by the envelope curve signal 105 in the ultrasonic measurement phase 125 and/or the time (=counter reading of the time counter 555 of the ultrasonic sensor 405) at which the ultrasonic sensor 405 has determined a first occurrence of a maximum of the envelope curve signal 105 above the threshold value curve 115 in the ultrasonic measurement phase 125.

Preferably, the ultrasonic sensor 405 subsequently transmits the measured values of the echo 141 that occurred second in time to the receive port RX of the UART data interface 560 of the superordinate computer system 505 via the transmit port TX of its UART data interface 430. These measured values of the second echo 141 can be, for example, the time (=counter reading of the time counter 555 of the ultrasonic sensor 405) at which the ultrasonic sensor 405 has determined a second exceeding of the threshold curve 115 by the envelope curve signal 105 in the ultrasonic measurement phase 125 and/or the time (=counter reading of the time counter 555 of the ultrasonic sensor 405) at which the ultrasonic sensor 405 has determined a second occurrence of a maximum of the envelope curve signal 105 above the threshold value curve 115 in the ultrasonic measurement phase 125.

Preferably, the ultrasonic sensor 405 then transmits the measured values of the echo 142 that occurred in time as the third echo to the receive port RX of the UART data interface 560 of the superordinate computer system 505 via the transmit port TX of its UART data interface 430. These measured values of the third echo 142 can be, for example, the time (=counter reading of the time counter 555 of the ultrasonic sensor 405) at which the ultrasonic sensor 405 determined a third crossing of the threshold curve 115 by the envelope curve signal 105 in the ultrasonic measurement phase 125 and/or the time (=counter reading of the time counter 555 of the ultrasonic sensor 405) at which the ultrasonic sensor 405 has determined a third occurrence of a maximum of the envelope curve signal 105 above the threshold value curve 115 in the ultrasonic measurement phase 125.

Preferably, the ultrasonic sensor 405 subsequently transmits the measured values of the echo 143 that occurred in time as the fourth echo to the receive port RX of the UART data interface 560 of the superordinate computer system 505 via the transmit port TX of its UART data interface 430. These measured values of the fourth echo 143 can be, for example, the time (=counter reading of the time counter 555 of the ultrasonic sensor 405) at which the ultrasonic sensor 405 determined a fourth crossing of the threshold curve 115 by the envelope curve signal 105 in the ultrasonic measurement phase 125 and/or the time (=counter reading of the time counter 555 of the ultrasonic sensor 405) at which the ultrasonic sensor 405 has determined a fourth occurrence of a maximum of the envelope curve signal 105 above the threshold value curve 115 in the ultrasonic measurement phase 125.

Transmission of such time stamps is not necessary if the superordinate computer system 505 in the ultrasonic measurement phase 125 detects the time between the start signal 185 of the ultrasonic measurement phase 125 or the start signal 625 of the actual measurement phase 615 and the occurrence of the signaling pulse of an echo (140 to 144), thus generating its own time stamp. Furthermore, due to the start signal 185 and the immediate signaling of an echo (140 to 144), the superordinate computer system 505 can not only generate its own time stamp for each signaling of an echo (140 to 144), but can also thus analyze and process the early-occurring echoes at an early stage, even though the ultrasonic measurement phase 125 has not yet ended. This is of particular importance in safety-related applications, since echoes 140 arriving early after the start signal 185 correspond to very close objects 515 which are accordingly generally more dangerous and may require a rapid response.

Although the ultrasonic sensor 405 can continue this transmission in an analog manner for any number of echoes, it has been shown that the transmission of further echoes generally no longer provides any significant gain in information and only leads to an increase in the time duration of the ultrasonic measurement phase 125 and the time duration of the third phase 130 of the ultrasonic measurement cycle 110, which in turn reduces the frequency of the successive ultrasonic measurements in the form of successive ultrasonic measurement cycles 110 of the ultrasonic sensor 405. This in turn is then detrimental to the safety of the vehicle and its occupants when too many echoes are transmitted.

Transmission of one or more check information 160, for example in the form of a check sum, for example in the form of one or more CRC bytes, completes the data transmission from the ultrasonic sensor 405 via the UART data interface 430 port of the ultrasonic sensor 405 to the UART data interface 560 port of the superordinate computer system 505, thereby completing the third phase 130 of the ultrasonic measurement cycle 110.

Thus, at the earliest, the third phase 130 of the ultrasonic measurement cycle 110 ends with the completion of the transmission of the last data, i.e., the last bit. One way to ensure that the superordinate computer system 505 detects the end of the third phase 130 of the ultrasonic measurement cycle 110 may be, first, at the beginning of the data transmission at the beginning of the third phase 130 of the ultrasonic measurement cycle 110, the ultrasonic sensor 405 sends an information about the maximum time length of the third phase 130 of the ultrasonic measurement cycle s110 ends to the superordinate computer system 505 and/or second, at the end of the data transmission in the third phase 130 of the ultrasonic measurement cycle 110, the ultrasonic sensor 405 sends a data end code to the superordinate computer system 505 that enables the superordinate computer system 505 to detect or calculate the end of the data transmission. Preferably, the ultrasonic sensor 405 sends such an end-of-data code namely before the check information 160 that allows the superordinate computer system 505 to verify the correct reception of the data in the third phase 130 of the ultrasonic measurement cycle 110. Thus, the superordinate computer system 505 may still need to take this time into account when calculating the end of the ultrasonic measurement cycle 110.

At the end of the third phase 130 of the ultrasonic measurement cycle 110, the UART data interface 560 of the superordinate computer system 505 preferably switches back to a state corresponding to the command phase 120 and/or an equivalent state.

Figure 2:
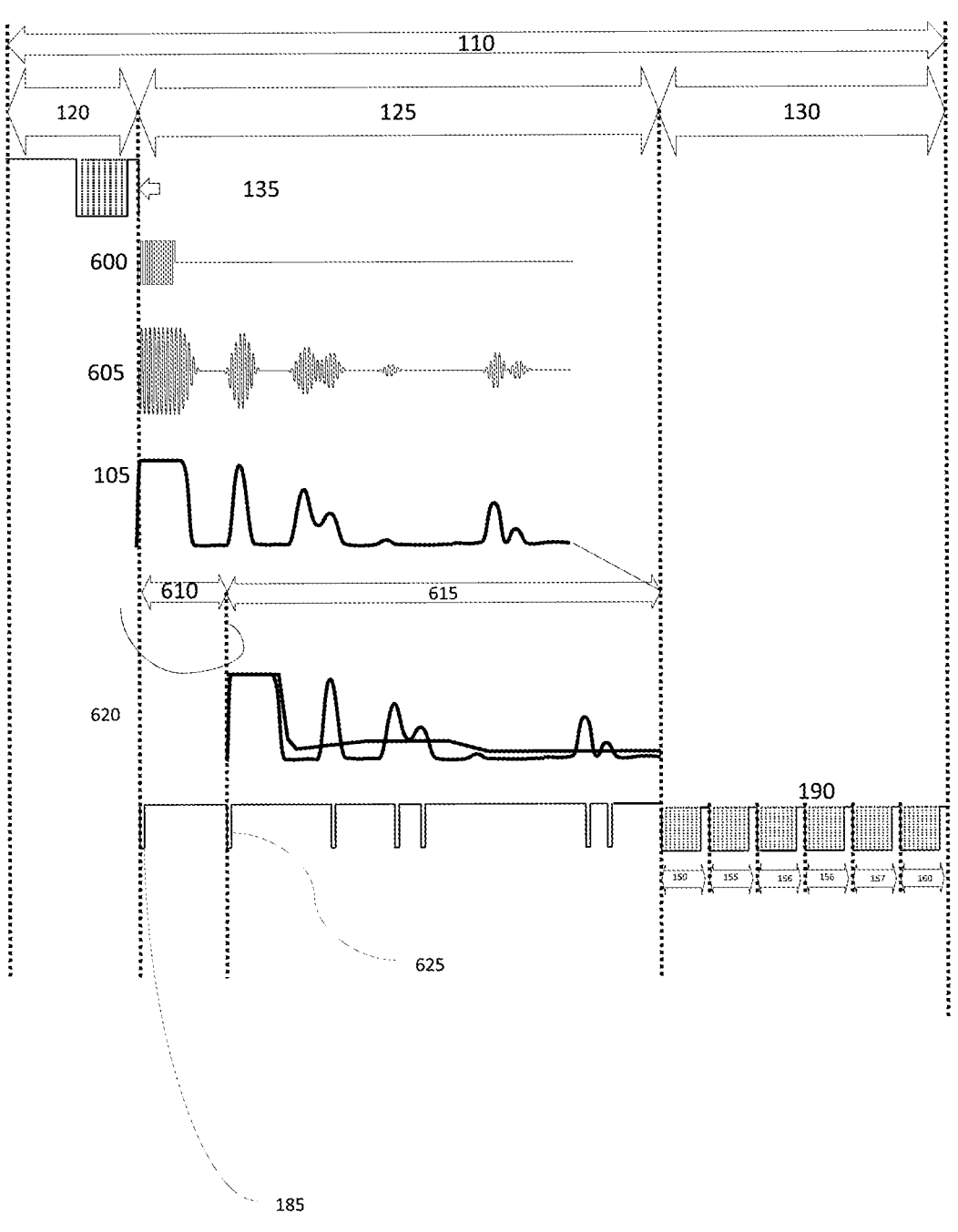
FIG. 2 shows similar content to FIG. 1, with the ultrasonic transducer drive signal 600 now shown.

FIG. 2 shows similar content to FIG. 1, with the ultrasonic transducer drive signal 600 now drawn. The ultrasonic controller 435 of the ultrasonic sensor 405 drives the ultrasonic transducer 465 or the ultrasonic transmitter of the ultrasonic sensor 405 in the transmission phase of the ultrasonic measurement phase 125 using the ultrasonic transducer driver signal 600 on the analog ultrasonic transmission signal 460 to drive the ultrasonic transducer 465. Thus, the ultrasonic controller 435 of the ultrasonic sensor 405 uses the ultrasonic transducer drive signal 600 to cause the oscillating element of the ultrasonic transducer 465 or ultrasonic transmitter to oscillate and transmit an ultrasonic burst or ultrasonic signal 510. Preferably, the UART data interface 430 controls the control device 410 of the ultrasonic sensor 405 and/or enables the control device 410 of the ultrasonic sensor 405 to exchange data with the superordinate computer system 505 via the UART data interface 430 of the ultrasonic sensor 405.

The oscillating element of the ultrasonic transducer 465 or ultrasonic receiver of the ultrasonic sensor 405 then generates the receiver signal 605 shown as an example in FIG. 2. The receiver signal 605 depends on the echoes of the objects 515 in the vicinity of the ultrasonic sensor 405. An envelope filter of the ultrasonic sensor 405 filters the receiver signal 605 of the ultrasonic sensor 405 to the envelope curve signal 105 of the ultrasonic sensor 405. An evaluation device of the ultrasonic sensor 405 detects echoes (140 to 144) in the envelope curve signal 105 of the ultrasonic sensor 405 depending on a threshold curve 115 and generates an echo signaling (140 to 144).

Preferably, the evaluation device of the ultrasonic sensor 405 ignores all echo-like signals in the envelope curve signal 105 of the ultrasonic sensor 405 that lie in a period corresponding to a "delay" 610 in the envelope curve signal 105 immediately after the start of the ultrasonic measurement phase 125. This means that the actual measurement phase 615, in which the ultrasonic sensor 405 signals received echoes (140 to 144) to the superordinate computer system 505 and stores measurement data of these echoes (140 to 144), is typically shorter in time than the ultrasonic measurement phase 125.

Thus, during the ultrasonic measurement phase, there may be a first pulse 185 that signals to the superordinate computer system 505 the start of the ultrasonic measurement phase 125, and a second pulse 625 that signals to the superordinate computer system 505 the start of the actual measurement phase 615. The superordinate computer system 505 can also use these two pulses 185 and 625 together to monitor the internal oscillator frequency of the system clock of the ultrasonic sensor 405, since the time spacing of the two pulses (185, 625) is known and shifts only with the oscillator frequency of the oscillator of the ultrasonic sensor 405 that generates the system clock of the ultrasonic sensor 405. A large change in the timing of these two pulses 185 and 625 may indicate a fault in the ultrasonic sensor 405. Preferably, therefore, the superordinate computer system 505 detects the temporal distance of the first pulse 185 from the second pulse 625 by means of its aforementioned time counter. If the value of this temporal distance does not lie within an expected value interval for the value of this temporal distance, the superordinate computer system 505 preferably concludes that the ultrasonic sensor 405 is faulty. Preferably, the superordinate computer system 505 reacts accordingly. Such a response may include, for example, shutting down the ultrasonic sensor 405, or initiating self-diagnostics of the ultrasonic sensor 405, or the like. The ultrasonic sensor system 400, 800 may use a small temporal shift of these two pulses (185, 625) with respect to each other to resynchronize the data interface 430 of the ultrasonic sensor 405. For example, the superordinate computer system 505 may use a synchronization signal as a command 135 in command phase 120 to force such resynchronization if the detected deviation is too large.

For example, an exemplary implementation idea of the technical teachings of the document presented herein provides that to start the measurement, the superordinate computer system 505 sends an exemplary 8 bit UART data packet from the superordinate computer system 505 (also referred to as bus master) to the ultrasonic sensor 405, which contains the command 135 (3 bit) to start the measurement and further information (4 bit) about the measurement process. In addition, it is protected by a parity bit, see also next point.

After the ultrasonic measurement in the ultrasonic measurement phase 125, the ultrasonic sensor 405 sends, according to suggestion, several UART data packets (each 8 bit long) from the ultrasonic sensor 405 to the superordinate computer system 505 in the third phase 130 of the ultrasonic measurement cycle 110. The first exemplary packet may, for example, comprise status information 150 on ultrasonic sensor errors of the ultrasonic sensor 405, the next 4 packets (155 to 158) preferably return the echo height (compressed to 8 bit) of the first 4 detected echoes (140 to 143). Everything is then secured by a further CRC packet (check information) 160. All packets should preferably be individually switchable on and off by means of commands 135 in the command phase 120, in order to be able to keep the communication time as short as possible as required.

Figure 3:
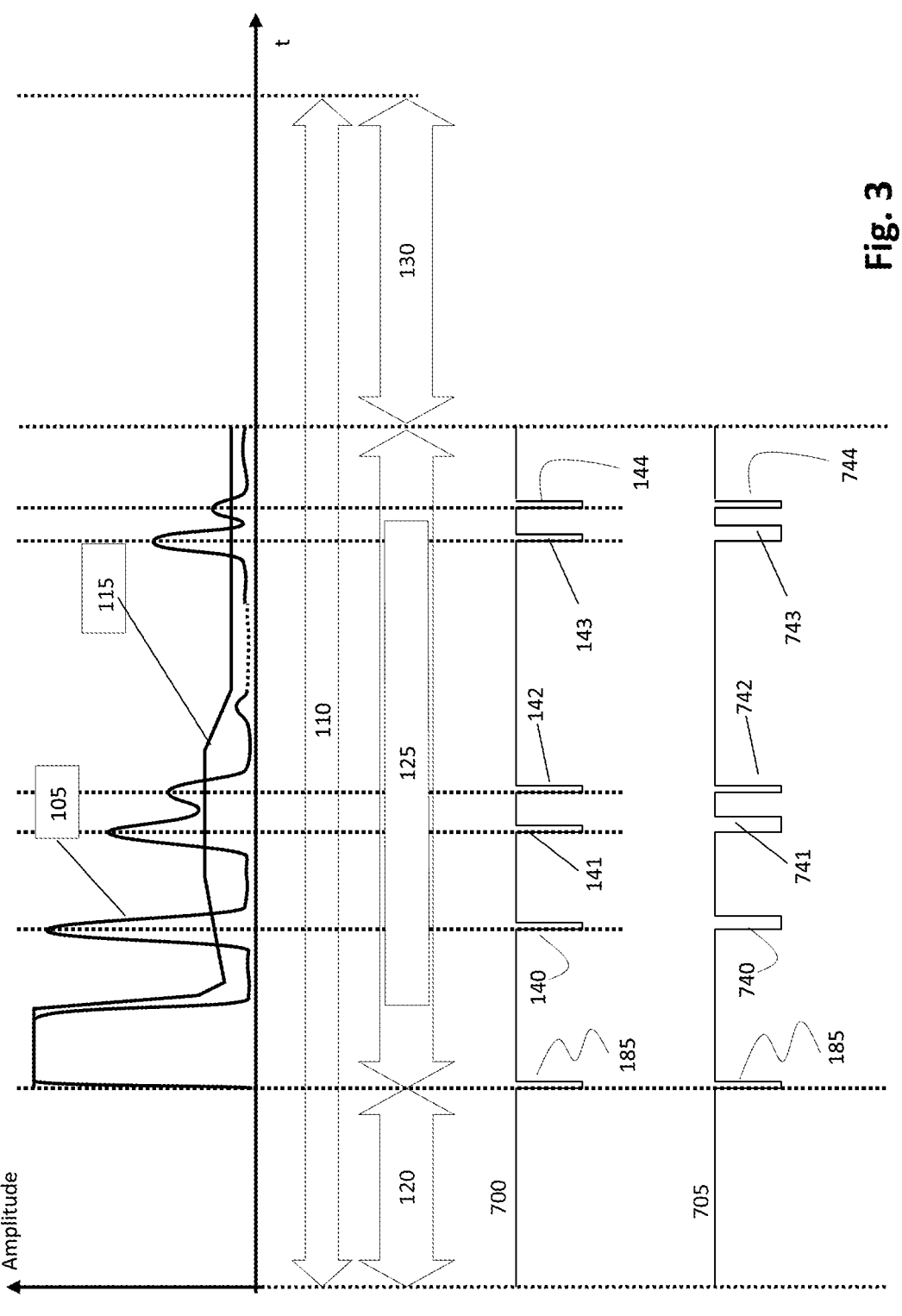
FIG. 3 proposes a new coding which modulates the pulse length, e.g., depending on the echo amplitude of the respective echo.

FIG. 3 proposes a new coding which modulates the pulse length, e.g., depending on the echo amplitude of the respective echo. In the previous ultrasonic control circuits, a constant long pulse (here exemplarily 50 μs) always signals the maximum of an echo (140 to 144) in the ultrasonic measurement phase 125 on the data bus 500. The document presented here proposes a new coding, which modulates the pulse length, e.g., depending on the echo amplitude of the respective echo. There are certainly further possibilities of the pulse length coding. Indeed, during the elaboration of the proposal presented here, it was recognized that the spacing of the echoes usually allows such pulse length modulation. This allows for a different information content. For example, a different pulse length encoding with several stages is conceivable.

One idea presented here is to encode the level of the measured echoes using the length of the pulse and signal it to the superordinate computer system 505.

For example, coding may be such that echoes whose amplitudes exceed the current value of threshold curve 115 but do not exceed twice the current value of threshold curve 115 are coded with a pulse length of a first temporal length, for example 50 μs.

For example, encoding may further be that echoes whose amplitudes exceed the current double value of the threshold curve 115 but do not exceed three times the current value of the threshold curve 115 are encoded with a pulse length of twice a first temporal length, for example 100 μs, and so on.

In this way, the superordinate computer system 505 can quickly determine whether the respective echo was a significant echo or rather a weak echo. (Compare FIG. 3 "new coding" 705 vs. "previous coding" 700).

Preferably, the ultrasonic sensor 405 stores the measurement profiles that the superordinate computer system 505 transmits to the ultrasonic sensor 405 in the command phase 120 in the non-volatile memory 415 of the ultrasonic sensor 405. This makes it possible to reduce the time-consuming data transmission of the configuration data of the respective measurement profile during each switch-on process of the ultrasonic sensor to a one-time transmission, for example, at the end of the production line.

Figure 4:
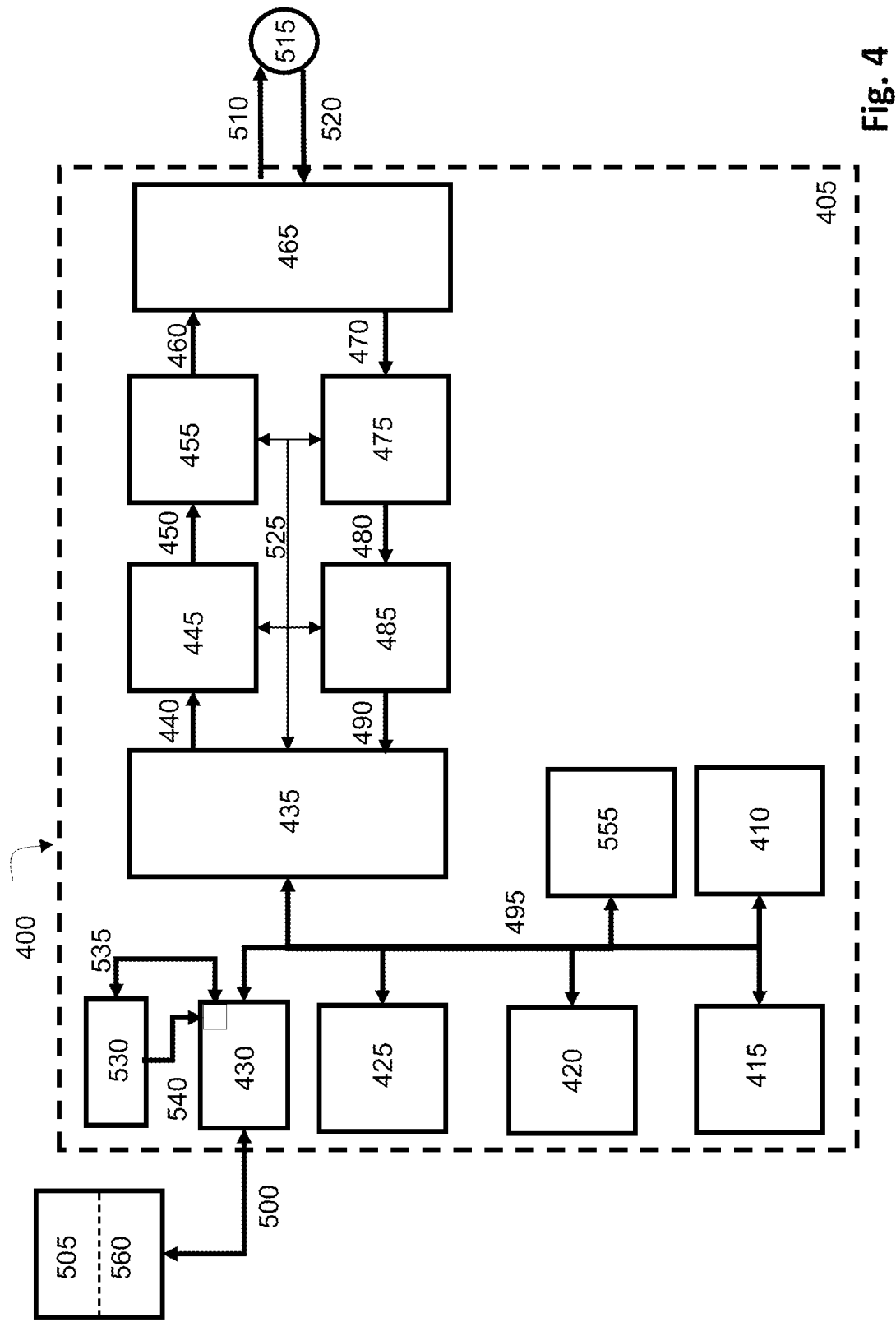
FIG. 4 schematically shows a proposed simplified ultrasonic system 400 with ultrasonic sensor 405.

FIG. 4 schematically shows a simplified ultrasonic system 400 with the ultrasonic sensor 405 according to the proposal. The control device 410 is preferably a microcomputer, for example an ARM controller, which controls the device parts of the ultrasonic sensor 405 and monitors their state via the data bus 495 and possibly further control and signal lines which are not shown for a better overview. In particular, the ultrasonic sensor preferably comprises a non-volatile memory 415, a volatile memory 420, and other peripheral blocks 425 of the control device 410 of the ultrasonic sensor 405. Furthermore, the ultrasonic sensor 405 comprises the modified UART data interface 430 that can perform the method presented in this writing. The control device 410 of the ultrasonic sensor 405 preferably controls the ultrasonic controller 435 of the ultrasonic sensor 405. The ultrasonic controller 435 generates digital control signals 440 of the ultrasonic controller 435 to control the digital portion 445 of the ultrasonic transmit path. The digital portion 445 of the ultrasonic transmit path of the ultrasonic sensor 405 generates the digital ultrasonic transmit signal 450 and the control signals 450 for the analog portion 455 of the ultrasonic transmit path therefrom. The analog portion 455 of the ultrasonic transmission path of the ultrasonic sensor 405 generates therefrom the analog ultrasonic transmission signal 460 for driving the ultrasonic transducer 465. The ultrasonic transducer 465 converts the analog ultrasonic transmission signal 460 into the ultrasonic signal 510, which it radiates into its environment. The object 515 in the ultrasonic transmission channel of the ultrasonic sensor 405 reflects the ultrasonic signal 510 as a reflected ultrasonic signal 520. The ultrasonic transducer 465 receives the reflected ultrasonic signal and converts it into an analog ultrasonic receive signal 470 of the ultrasonic transducer 465. The analog portion 475 of the ultrasonic receive path of the ultrasonic sensor 405 generates the digital ultrasonic receive signal 480 of the ultrasonic transducer 465 therefrom. The digital portion 485 of the ultrasonic receive path of the ultrasonic sensor 405 extracts receive, classification, status, and test result data 490 therefrom and provides the same to the control device 410 via the ultrasonic controller 435 over the internal data and control bus 495 of the ultrasonic sensor 405. The external data bus 500 is used for the modified UART data communication with the superordinate computer system 505 discussed in this document. In the example shown in FIG. 4, the external data bus 500 is a single-wire data bus 500. The ultrasonic sensor 405, according to the disclosure communicates with the superordinate computer system 505 via its UART data interface 560 in a UART mode 190 and in a signaling mode 195.

Between the ultrasonic controller 435 and the device parts (445, 455, 465, 475, 485 of the ultrasonic transmitting and receiving paths, control signals 525 for controlling the controllable device parts (445, 455, 465, 475, 485) of the ultrasonic receiving path (515, 520 465, 470, 475, 480, 485, 490) and the ultrasonic transmitting path (440, 445, 450, 455, 460, 465, 510, 515) and status signals of these device parts (445, 455, 465, 475, 485) for analyzing and monitoring the status of these device parts (445, 455, 465, 475, 485) by the ultrasonic controller 435 signal the status of these device parts to the ultrasonic controller 435, and allow the ultrasonic controller 435 to control these device parts. This also allows the control device 410 to control these device parts.

In addition, the ultrasonic sensor 405 includes a UART clock or UART oscillator 530. The UART data interface 430 may use synchronization lines 535 to synchronize the UART clock or UART oscillator 530 with the clock and/or frequency and/or phase of a synchronization signal on the data bus 500 to synchronize the UART clock frequency of the system clock of the ultrasonic sensor 405 and/or the UART system clock 540 of the UART clock or UART oscillator 530. The UART data interface 430 uses the system clock 540 of the ultrasonic sensor 405 and/or the UART system clock of the UART clock or UART oscillator 530 that is then so synchronized.

In accordance with suggestions, the ultrasonic sensor 405 includes a time counter 555 that typically terminates the ultrasonic measurement phase 125, for example, after a programmed, or set, or predetermined period of time has elapsed, and may be used to determine time stamps for echo data in the ultrasonic measurement phase 125.

Figure 5:
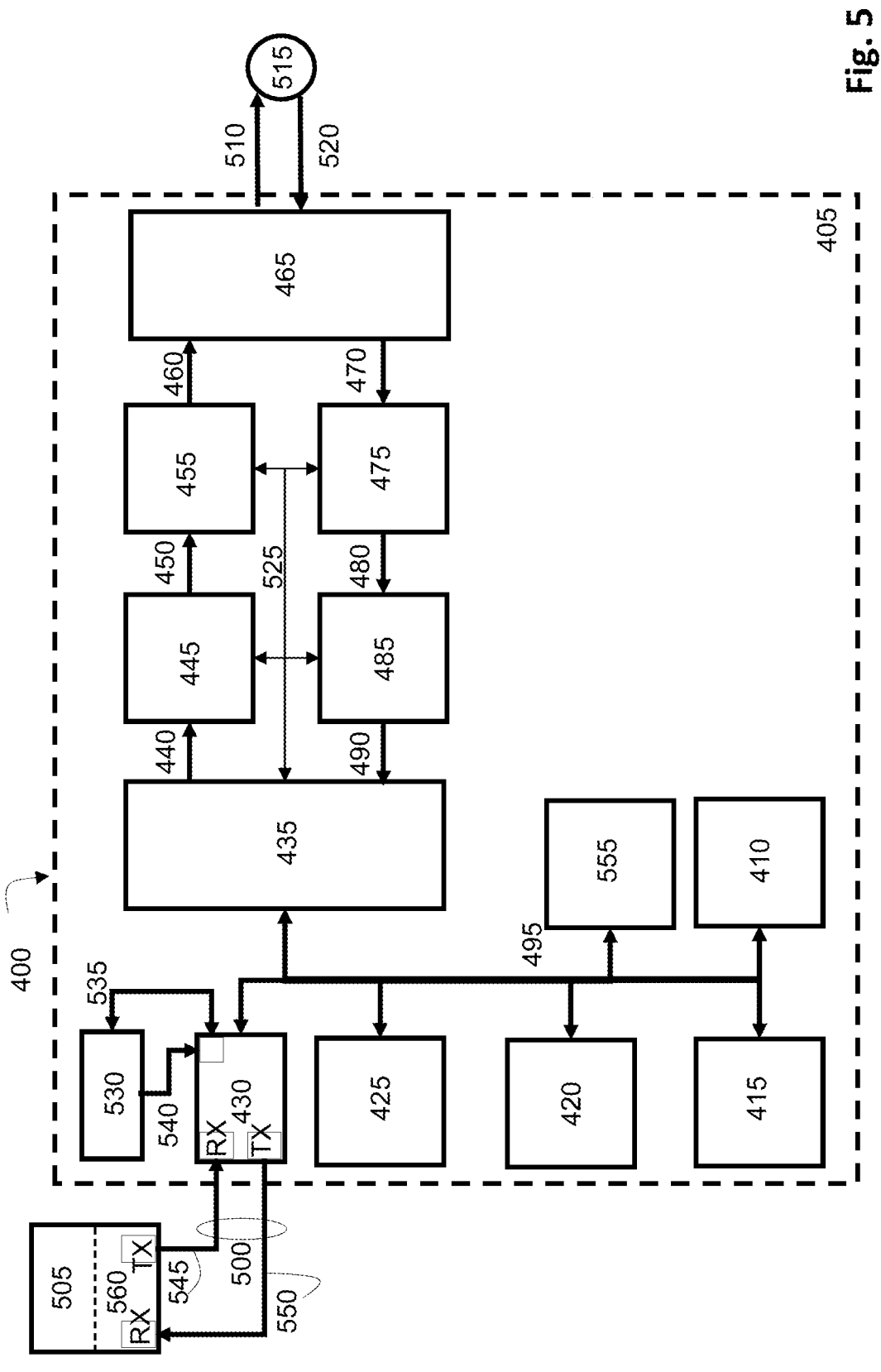
FIG. 5 largely corresponds to FIG. 4, except that the data bus 500 is not a single-wire data bus, but a two-wire data bus.

FIG. 5 corresponds largely to FIG. 4, with the difference that the data bus 500 is not a single-wire data bus, but a two-wire data bus. This two-wire data bus comprises a first data line 545 for the transmission of data from the ultrasonic sensor 405 to the superordinate computer system 505. The data transmission via this first data line 545 by means of UART protocol is interrupted in the ultrasonic measurement phase 125 and replaced by a signaling by means of the described signaling protocol for the duration of the ultrasonic measurement phase 125 in order to be able to signal the echoes (140, 141, 142, 143, 144) promptly without delay. The two-wire data bus includes a second data line 550 for transmitting data from the superordinate computer system 505 to the ultrasonic sensor 405. Data transmission over this second data line 550 using the UART protocol is typically not interrupted during the ultrasonic measurement phase 125.

Figure 6:
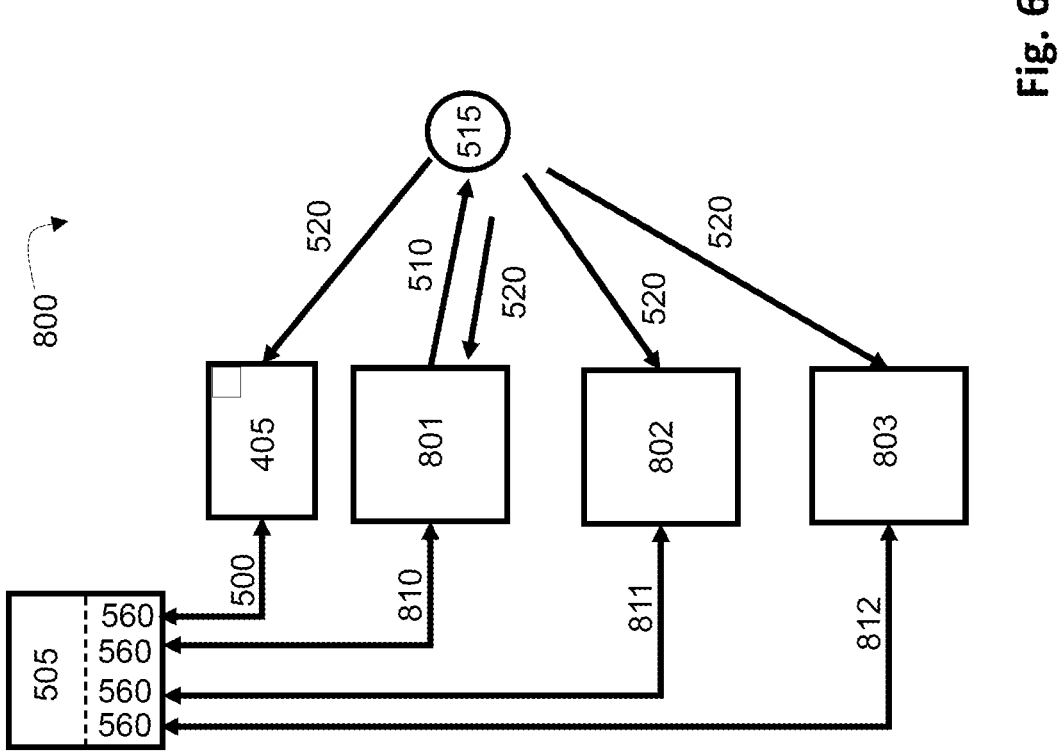
FIG. 6 shows an ultrasonic system 800 with multiple ultrasonic sensors (405, 801 to 803).

FIG. 6 illustrates an ultrasonic system 800 with multiple ultrasonic sensors (405, 801 to 803). For simplicity, the document presented herein assumes that these ultrasonic sensors are constructed in the same manner without limiting the technical teachings of this document thereto.

In the example of FIG. 6, an ultrasonic sensor 801 other than the ultrasonic sensor 405 transmits the ultrasonic signal 510, while all of the ultrasonic sensors (405, 801 to 803) receive a respective reflected ultrasonic signal 520. In the example of FIG. 6, all of these ultrasonic sensors (405, 801 to 803) communicate using a point-to-point data link in the manner described above with the superordinate computer system 505 via a respective modified UART data interface 560.

Figure 7:
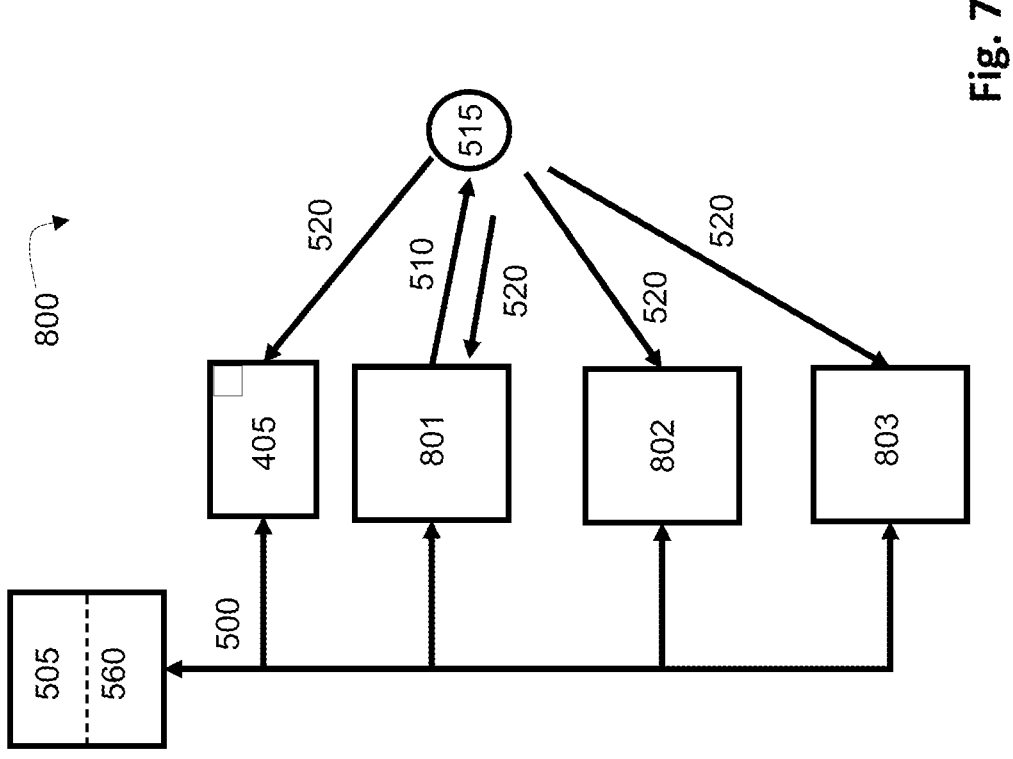
FIG. 7 corresponds to FIG. 6, wherein in the example of FIG. 7 all of the ultrasonic sensors (405, 801 to 803) communicate by means of a star-shaped data link in the manner described above with the superordinate computer system 505 via a modified UART data interface 560 over a common data bus 500.

FIG. 7 corresponds to FIG. 6, but in the example of FIG. 7, all of these ultrasonic sensors (405, 801 to 803) communicate with the superordinate computer system 505 via a modified UART data interface 560 over a common data bus 500 by means of a star-shaped data link in the manner described above. For this to be possible, it is necessary that bus collision be avoided. Typically, such a configuration is not practical, as it usually desired to signal echoes from all ultrasonic sensors simultaneously, which this configuration cannot provide.

Glossary

UART

The following text is a quote from the corresponding Wikipedia page (https://de.wikipia.org/wiki/Universal_Asynchronous_Receiver_Transmitter):

"Universal Asynchronous Receiver Transmitter, or UART for short, is an electronic circuit used to implement digital serial interfaces. It can be an independent electronic component (a UART chip or device) or a function block of a higher integrated component (e.g., a microcontroller). A UART data interface is used to send and receive data via a data line and forms the standard for serial interfaces on PCs and microcontrollers. The interface is also very common in the industrial sector with different interfaces (e.g., RS-232 or EIA-485 or RS-485). The data is transmitted as a serial digital data stream with a fixed frame consisting of a start bit, five to a maximum of eight or nine data bits (depending on the application), an optional parity bit for detecting transmission errors and one or two stop bits. The transmitter does not need to communicate the transmit clock to the receiver via its own control line. Instead, the receiver calculates the transmitter's clock from the data line clock and synchronizes to it using the start and stop bits. Usually, the stop bit can be configured to be 1.5 or 2 times the normal transmission time of a bit. This is called 1.5 or 2 stop bits and must be set equally at both the transmitter and receiver. Because the receiver recalculates the clock of the transmitter with each byte received and resynchronizes to it each time, even large differences in clock between transmitter and receiver can be compensated. Even short-term clock fluctuations are quickly compensated for. This is why this type of data transmission is called "asynchronous" and this type of synchronization "byte synchronous".

Thus, a universal asynchronous receiver-transmitter as defined herein is typically a computer hardware device for asynchronous serial communication in which the data format and transmission rate are configurable. It transmits the data bits sequentially, preferably from least significant to most significant, preferably framed by start and stop bits synchronously in as fixed a phase relationship as possible to a UART clock so that the communication channel allows precise timing. Electrical signal levels are typically handled by driver circuitry external to the UART logic. Two common signal levels are with the RS-232 system, a 12-volt system, and with the RS-485, a 5-volt system. Early teletype devices also used current loops.

A UART is usually a single (or part of an) integrated circuit (IC) used for serial communication through a serial port of a computer or peripheral device. One or more UART peripherals are usually integrated into microcontroller chips. Specialized UARTs are used for automobiles, smart cards, and SIM cards.

In the case at hand, the focus is on its use for communication between a superordinate computer system and an ultrasonic sensor.

A related device, the universal synchronous and asynchronous receiver-transmitter (USART), also supports synchronous operation.

In general, a UART data interface has a transmit output, usually labeled TX, and a receive input, usually labeled RX.

When UARTs are mentioned here in this document, so-called USART interfaces are also to be included. The reader may then replace UART with USART. This applies in particular to the claims.

For the purposes of the document presented herein, a universal synchronous and asynchronous receiver-transmitter (USART, programmable communications interface, or PCI) is a serial interface device that can be programmed for asynchronous or synchronous communications.

The synchronous capabilities of the USART were primarily intended to support synchronous protocols such as IBM's synchronous transmit-receive (STR), binary synchronous communications (BSC), synchronous data link control (SDLC), and ISO-standardized high-level data link control (HDLC) protocols used with synchronous voice frequency modems. These protocols were developed to make the best use of bandwidth when modems were still analog devices. At that time, the fastest asynchronous frequency shift keying (FSK) voiceband modem could achieve speeds of 300 bits/s at most, while synchronous phase shift keying (PSK) modems could achieve speeds of up to 9600 bits/s. Synchronous transmission required only slightly more than 80% of the bandwidth of today's asynchronous transmission because start and stop bits were unnecessary. These modems are obsolete and have been replaced by modems that convert asynchronous data to synchronous forms, but similar synchronous telecommunications protocols survive in numerous block-oriented technologies such as the widely used IEEE 802.2 (Ethernet) link-level protocol. USARTs are sometimes still integrated into MCUs. USARTs are still used in routers connected to external CSU/DSU devices, and they often use either Cisco's proprietary HDLC implementation or the IETF standard point-to-point protocol (PPP) in HDLC-like framing as defined in RFC 1662.

The operation of a USART is closely related to the various protocols.

USARTs in synchronous mode transmit data in frames. In synchronous mode, the characters must be provided in time until a frame is complete. If the controlling processor does not do this, it is a so-called "underrun error," and the transmission of the frame is aborted.

USARTs operating as synchronous devices use either character-oriented or bit-oriented modes. In character-oriented mode (STR and BSC), the device relied on specific characters to define frame boundaries; in bit-oriented mode (HDLC and SDLC), earlier devices relied on physical layer signals, while later devices adopted physical layer detection of bit patterns.

A synchronous line is never silent; when the modem is transmitting, the data is flowing. When the physical layer indicates that the modem is active, a USART sends a steady stream of padding, either characters or bits, depending on the device and protocol.

CONCLUSION

The above description does not purport to be complete and does not limit this disclosure to the examples shown. Other variations on the disclosed examples can be understood and performed by those of ordinary skill in the art with reference to the drawings, the disclosure, and the claims. The German indefinite articles "ein" or "eine" (English "a" or "an") and inflections thereof do not preclude a plurality, while mention of a specific number of elements does not preclude the possibility that more or fewer elements are present. A single entity may fulfill the functions of multiple elements mentioned in the revelation, and conversely, multiple elements may fulfill the function of one entity. Numerous alternatives, equivalents, variations and combinations are possible without departing from the scope of the present disclosure.

Unless otherwise indicated, a free combination of all features of the present disclosure with each other is expressly part of the technical teachings described herein. This applies to the entire document presented herein. Also, unless otherwise indicated, a free combination of the features described in the figure description is expressly part of the technical teaching disclosed herein as a combination from the features of the disclosure with the other features of the technical teaching of this document. In this regard, a limitation of individual features of the examples to combination with other features of the examples is expressly not intended. In addition, representational features of the device may also be used as process features in a reformulated manner, and process features may be used as representational features of the device in a reformulated manner. Such a reformulation is thus automatically disclosed in this document.

In the preceding detailed description, reference is made to the attached drawings. The examples in the description and drawings should be considered illustrative. The examples in the description of this document should not be considered limiting of the specific example or element described. Multiple examples may be derived from the foregoing description and/or drawings and/or claims of this document by modification, combination or variation of specific elements. In addition, a person skilled in the art may derive examples or elements that are not literally described from the description and/or drawings.

LIST OF REFERENCE LABELS

105 Envelope curve signal;
110 Ultrasonic measurement cycle;

115 Threshold curve;
120 Command phase, first phase of the ultrasonic measurement cycle 110;
125 Ultrasonic measurement phase (echo signaling), second phase of the ultrasonic measurement cycle 110. In the ultrasonic measurement phase, the ultrasonic sensor 405 signals the occurrence of an echo (140, 141, 142, 143, 144) directly to the superordinate computer system 505 via the UART data interface 430 using a signaling protocol that differs from the UART protocol;
130 third phase of the ultrasonic measurement cycle 110: status and echo Information phase;
135 Commands;
140 Echo1 signal;
141 Echo2 signal;
142 Echo3 signal;
143 Echo4 signal;
144 Echo5 signal;
150 Status data;
155 Data of the first echo 140;
156 Data of the second echo 141;
157 Data of the third echo 142;
158 Data of the fourth echo 143;
160 CRC and/or check information;
165 the superordinate computer system 505 sends data and commands 135 to the control device 410 of the ultrasonic sensor 405 using a UART protocol via the external data bus 500 and the UART data interface 430 of the ultrasonic sensor 404;
170 the ultrasonic sensor 405 transmits signals (140 to 144) for received echoes to the superordinate computer system 505 via the external data bus 500 using the UART data Interface 430 of the ultrasonic sensor 405, wherein the UART data interface 430 does not use a UART protocol but forces the data line from the ultrasonic sensor 405 to the superordinate computer system 505 from a first logic state to a second logic state for typically one clock period of the UART clock when the ultrasonic sensor 405 has detected an echo;
175 the ultrasonic sensor 405 sends status data and/or echo data and/or classification data and/or self-test result data and/or test data, etc., to the superordinate computer system 505 via the external data bus 500 by means of the UART data interface 430 of the ultrasonic sensor 405 using a UART protocol;
180 the superordinate computer system 505 sends data and/or commands to the control device 410 of the ultrasonic sensor 405 or a similar device via the external data bus 500 and the UART data interface 430 of the ultrasonic sensor, preferably using a UART protocol, and/or reads data from the ultrasonic sensor 405 using a UART protocol.
185 Start signal with which the ultrasonic sensor 405 signals the start of the ultrasonic measurement phase and the start of the transmission of the ultrasonic signal 510 to the superordinate computer system 505 via the data bus 500 without using the UART protocol. This may be, for example, a first pulse of exemplary 50 µs duration marking the start of the measurement in the ultrasonic measurement phase 125 and the time of the first filter measurement point for the signal processing chain;
190 UART mode of data transmission between the UART data interface 430 and the superordinate computer system 505 via the external data bus 500, which uses the UART protocol in UART mode;

195 signaling mode of data transmission between the UART data interface 430 and the superordinate computer system 505 via the external data bus 500, the signaling mode puling the data line of the data bus from a first logical state to a second logical state for, for example, one UART clock period upon detection of an echo by the ultrasonic sensor 405;

400 simplified ultrasonic system

405 Ultrasonic sensor;

410 Control device;

415 non-volatile memory;

420 volatile memory;

425 other peripheral blocks that are part of the ultrasonic sensor 405 and part of the internal computing system of the ultrasonic sensor 405;

430 UART data interface (modified);

435 Ultrasonic controller;

440 Control signals of the ultrasonic control for controlling the digital part of the ultrasonic transmission path;

445 Digital part of the ultrasonic transmission path of the ultrasonic sensor 405;

450 digital ultrasonic transmission signal and control signals for the analog portion 455 of the ultrasonic transmission path;

455 Analog portion of ultrasonic transmission path of ultrasonic sensor 405;

460 analog ultrasonic transmission signal for controlling the ultrasonic transducer 465;

465 Ultrasonic transducer;

470 analog ultrasonic reception signal of the ultrasonic transducer 465;

475 Analog portion of ultrasonic receive path of ultrasonic sensor 405;

480 digital ultrasonic reception signal of the ultrasonic transducer 465;

485 Digital portion of the ultrasonic reception path of the ultrasonic sensor 405;

490 Reception, classification, status and test result data;

495 internal data and control bus of the ultrasonic sensor 405;

500 external data bus over which the modified UART data communication discussed in this document takes place;

505 superordinate computer system with which the ultrasonic sensor 405 communicates via the data bus 500, 510 emitted ultrasonic signal;

515 Object or objects that reflect the ultrasonic signal;

520 reflected ultrasonic signal;

525 Control signals for controlling the controllable device parts (445, 455, 465, 475, 485) of the ultrasonic receiving path (515, 520 465, 470, 475, 480, 485, 490) and the ultrasonic transmitting path (440, 445, 450, 455, 460, 465, 510, 515) and status signals of these device parts (445, 455, 465, 475, 485) for analysis and monitoring of the status of these device parts (445, 455, 465, 475, 485) by the ultrasonic controller 435;

530 UART clock generator or UART oscillator;

535 Synchronization lines for synchronizing the UART clock or UART oscillator 530 with the clock and/or frequency and/or phase of a synchronization signal on the data bus 500 to synchronize the UART clock frequency of the system clock of the ultrasonic sensor 405 and/or the UART system clock 540 of the UART clock or UART oscillator 530;

540 System dock of the ultrasonic sensor 405 and/or the UART system clock of the UART clock or UART oscillator 530;

545 Data line for transmitting data from the ultrasonic sensor 405 to the superordinate computer system 505. The data transmission via this data line using the UART protocol is interrupted in the ultrasonic measurement phase 125 and replaced by signaling using the described signaling protocol for the duration of the ultrasonic measurement phase 125 in order to be able to signal the echoes (140, 141, 142, 143, 144) promptly without delay;

550 Data line for transmitting data from the superordinate computer system 505 to the ultrasonic sensor 405. Data transmission over this data line using the UART protocol is typically not interrupted during the ultrasonic measurement phase 125;

555 Time Counter 555, which typically terminates the ultrasonic measurement phase 125 after a programmed, or set, or predetermined period of time has elapsed;

560 UART data Interface of the superordinate computer system 505;

600 Transducer drive signal of analog ultrasonic transmit signal 460 to drive ultrasonic transducer 465;

605 reception signal of the analog ultrasonic reception signal 470 of the ultrasonic transducer 465;

610 the transmission phase and the decay phase of the oscillating element of the ultrasonic transducer 465;

615 actual measurement time;

620 Signal processing and echo detection;

625 exemplary second pulse of, for example, 50 μs duration with a first filter measuring point from the signal processing chain of the ultrasonic sensor 405, which signals the end of the decay phase and the transmission phase 610 to the superordinate computer system 505;

700 previous coding without signaling the echo height in the ultrasonic measurement phase 125;

705 modified coding. With modified coding, the duration of an echo signal depends on the height of the maximum of an echo signal;

740 temporally very long first signaling of the amplitude-wise very high first echo;

741 temporally very long second signaling of the amplitude-wise very high second echo;

742 temporally shorter third signaling of the amplitude-wise smaller third echo;

743 temporally very long fourth signaling of the amplitude-wise very high fourth echo;

744 temporally short fifth signaling of the amplitude-wise smaller fifth echo;

A Amplitude;

t Time;

t0 Start time of ultrasonic measurement cycle 110 and start time of command phase 120, wherein in the subsequent command phase 120, the superordinate computer system 505 sends one or more commands 135 to the ultrasonic sensor 405 using a UART protocol via the UART data interfaces 560 of the superordinate computer system 505 and the UART data interface 430 of the ultrasonic sensor 405;

t1 end time of the command phase 120 and start time of the ultrasonic measurement phase 125. Typically, a start signal 185 signals the start of the ultrasonic measurement phase 125 to the superordinate computer system 505 via the data bus 500. Beginning with this start time of the ultrasonic measurement phase or at least in a fixed time reference subsequent to this start time, the ultrasonic sensor 405 typically emits an ultrasonic burst or an ultrasonic signal. Preferably, at the start time t of the ultrasonic measurement phase 125, the ultrasonic sensor 405 starts a time counter 555 that typically terminates the ultrasonic measurement phase 125 after a programmed, or set, or predetermined amount of time has elapsed;

t2 end time of the ultrasonic measurement phase 125 and start time of the third phase 130 of the ultrasonic measurement cycle 110. Preferably, the time counter 555 determines this end time of the ultrasonic measurement phase 125 and the start time of the third phase 130 of the ultrasonic measurement cycle 110 by means of the expiration of a programmed, or set, or predetermined time period from the start time t1 of the ultrasonic measurement phase 125;

t3 end of the ultrasonic measurement cycle 110. The end of the ultrasonic measurement cycle can be transmitted by the ultrasonic sensor 405 to the superordinate computer system 505, for example, by means of a special end signal as the date of the data transmitted in the third phase 130 of the ultrasonic measurement cycle 110, whereby such an end signal can preferably still be followed by a predetermined amount of data, for example, for check information such as CRC checks, etc. Instead of an end signal, it is also conceivable that the ultrasonic sensor 405 transmits to the superordinate computer system 505, at the beginning of the third phase 130 of the ultrasonic measurement cycle 110, information about the amount of data that the ultrasonic sensor 405 is still transmitting or transmits in total in this third phase 130 of the ultrasonic measurement cycle 110, so that the superordinate computer system 505 can calculate the end of the ultrasonic measurement cycle 110.

What is claimed is:

1. An ultrasonic sensor comprising:

an ultrasonic transducer; and a processor programmed to:

communicate with a superordinate computer system by means of a UART protocol via a UART data interface of the ultrasonic sensor;

perform a method for communicating with the superordinate computer system using the UART protocol;

perform the method in temporally sequential and temporally non-overlapping ultrasonic measurement cycles;

perform a respective current ultrasonic measurement cycle in at least three temporally successive phases, wherein the ultrasonic sensor is configured such that a same UART data line of the UART data interface is used, in a first and third phases, for transmission of data frames in accordance with the UART protocol, and, in a second phase, for transmission of signaling information not in accordance with the UART protocol;

receive a command in UART form;

based on the received command, start an ultrasonic measurement cycle at a beginning of a first phase of the ultrasonic measurement cycle, hereinafter referred to as a command phase;

receive at least one command from the superordinate computer system in the command phase, which command specifies which type of measurement the ultrasonic sensor is to perform in the ultrasonic measurement cycle;

emit, via the ultrasonic transducer, an ultrasonic burst or signal at a beginning of a second phase, hereinafter referred to as an ultrasonic measurement phase, wherein, the ultrasonic sensor is arranged such that characteristics of the ultrasonic burst and/or the ultrasonic signal depend on a temporally preceding and/or an immediately temporally preceding command received by the ultrasonic sensor in a temporally preceding and/or the immediately temporally preceding command phase;

interrupt communication, within the ultrasonic measurement cycle, from the ultrasonic sensor to the superordinate computer system in accordance with the UART protocol during the ultrasonic measurement phase;

set the signal of the UART data interface of the ultrasonic sensor to a first logical value during the ultrasonic measurement phase when the ultrasonic sensor is not receiving an echo, and to set the signal of the UART data interface to a second logical value during the ultrasonic measurement phase when the ultrasonic sensor is receiving, via the ultrasonic transducer, an echo, the first logical value being different from the second logical value, and wherein, during the ultrasonic measurement phase, the ultrasonic sensor does not transmit any UART frames on the UART data interface, but instead drives the UART data interface continuously to a first logical value when no echo is received and to a second logical value and/or pulse sequence when an echo is received;

terminate the ultrasonic measurement phase after a predetermined time and/or when predetermined conditions are present and to begin a third phase of the ultrasonic measurement cycle;

restart communication according to the UART protocol after an end of the ultrasonic measurement phase in the third phase of the ultrasonic measurement cycle; and transmit data in the third phase of the ultrasonic measurement cycle from the ultrasonic sensor to the superordinate computer system and wherein a plurality of ultrasonic measurement cycles are performed in succession, each ultrasonic measurement cycle comprising a command phase, an ultrasonic measurement phase, and a third phase in this order, with no temporal overlap between the first, second and third phases, and wherein communication from the ultrasonic sensor to the superordinate computer system according to the UART protocol occurs only in the command phase and the third phase of each ultrasonic measurement cycle and not in the ultrasonic measurement phase.

2. The ultrasonic sensor according to claim 1, wherein, the least one command from the superordinate computer system specifies which type of measurement the ultrasonic sensor is to perform in the ultrasonic measurement phase of the current ultrasonic measurement cycle.

3. The ultrasonic sensor according to claim 1, wherein the ultrasonic sensor is adapted to set the signal of the UART data interface of the ultrasonic sensor to the first logical value during the ultrasonic measurement phase for a predetermined pulse time duration when the ultrasonic sensor is not receiving an echo, and otherwise set the signal of the UART data interface to the second logical value during the ultrasonic measurement phase when the ultrasonic sensor is receiving an echo, wherein the first logical value is different from the second logical value.

4. The ultrasonic sensor according to claim 1, wherein a pulse duration depends on a parameter of the received echo.

5. The ultrasonic sensor according to claim 1, wherein a pulse duration depends on an amplitude of the received echo.

6. The ultrasonic sensor according to claim 1, wherein the data that the ultrasonic sensor transmits from the ultrasonic sensor to the superordinate computer system in the third phase of the ultrasonic measurement cycle comprises one or more of:

status information representing measured values of physical parameters of the ultrasonic sensor;

status information representing logical values of logical switching networks within the ultrasonic sensor;

status information reflecting results of self-tests of the ultrasonic sensor;

status information representing measured values of an ultrasonic transmission path of the ultrasonic sensor into which the ultrasonic sensor transmits ultrasonic signals and/or from which it receives ultrasonic signals;

status information indicating which type of ultrasonic burst and/or ultrasonic signal that the ultrasonic sensor intends to have emitted in the immediately preceding ultrasonic measurement phase;

status information indicating values of the ultrasonic burst and/or ultrasonic signal that the ultrasonic sensor intends to have emitted in the immediately preceding ultrasonic measurement phase;

information indicating values of the ultrasonic burst and/or ultrasonic signal that the ultrasonic sensor intends to have been received in the immediately preceding ultrasonic measurement phase;

echo information representing measured values of the echoes received in the ultrasonic measurement phase, wherein these measured values represent a number of the echo, and/or an amplitude of the echo, and/or a time of reception of the echo, and/or a confidence value for a probability that the echo is actually an echo of an object in the ultrasonic transmission path of the ultrasonic sensor;

command information indicating which command(s) the ultrasonic sensor received in one of the preceding command phases and/or in the immediately preceding command phase;

command information indicating which command(s) the ultrasonic sensor received in one of the preceding command phases and/or in the immediately preceding command phase and which determined which type of ultrasonic burst or ultrasonic signal the ultrasonic sensor emitted;

check information of the data transmitted in the third phase of the ultrasonic measurement cycle, in particular CRC data, wherein the superordinate computer system is able to check this check information to verify a proper reception of the data transmitted by the ultrasonic sensor to the superordinate computer system in the third phase of the ultrasonic measurement cycle;

check information of the information signaled in the ultrasonic measurement phase, wherein the superordinate computer system can check this check information to verify the proper reception of the information signaled in the ultrasonic measurement phase;

check information of the commands signaled in the command phase by the superordinate computer system, wherein the superordinate computer system can check this check information to verify the proper reception by the ultrasonic sensor of the commands signaled in the command phase;

check information of the commands signaled in the command phase, indicating whether the ultrasonic sensor detected an error in the transmission of one or more commands from the superordinate computer system to the ultrasonic sensor in the command phase;

test information reflecting the results of self-tests or tests of the ultrasonic sensor; and length information indicating or enabling to calculate how much data the ultrasonic sensor transmits in the third phase of the ultrasonic measurement cycle from the ultrasonic sensor to the superordinate computer system;

wherein the ultrasonic sensor is adapted to form a received signal of the ultrasonic transducer of the ultrasonic sensor or an ultrasonic receiver of the ultrasonic sensor in response to an ultrasonic acoustic signal received by the ultrasonic sensor.

7. The ultrasonic sensor according to claim 1, wherein the ultrasonic sensor is adapted to transmit a synchronization signal for synchronizing a UART clock frequency of a participant of a UART communication via the UART data interface.

8. The ultrasonic sensor according to claim 7, wherein:

the ultrasonic sensor comprises a system clock and/or a UART system clock of the UART data interface; and the ultrasonic sensor changes parameters of the system clock and/or the UART system clock in response to the synchronization signal transmitted to the ultrasonic sensor to synchronize the UART clock frequency.

9. The ultrasonic sensor according to claim 1, wherein the ultrasonic sensor is adapted to receive and execute one or more commands in the command phase, the command comprising one or more of following commands and/or subcommands:

synchronization information for synchronizing a system clock of the ultrasonic sensor and/or a UART clock of the UART data interface;

a length information indicating which length the command has and/or how many command data the command comprises;

a check information, in particular a check bit and/or a check value, such as in particular a CRC check sum, of the command and/or several commands;

a number of subcommands that make up an entire command;

a command or subcommand that the ultrasonic sensor is to repeatedly perform the measurement in the ultrasonic measurement phase in a manner that the ultrasonic sensor performed the measurement in a last ultrasonic measurement phase;

a command or subcommand that the ultrasonic sensor repeatedly performs a measurement in the ultrasonic measurement phase in the manner that the ultrasonic sensor performed a previous measurement in a previous ultrasonic measurement phase;

a command or subcommand that the ultrasonic sensor is to perform the measurement in a subsequent ultrasonic measurement phase according to a predetermined form known to the ultrasonic sensor;

a command or subcommand that the ultrasonic sensor is to perform the measurement in the ultrasonic measurement phase immediately following the command phase according to a predetermined form known to the ultrasonic sensor;

a command or subcommand that the ultrasonic sensor is to perform the measurement in a subsequent ultrasonic measurement phase with an ultrasonic burst that is to show a chirp corresponding to a previously performed chirp direction in a previously performed ultrasonic measurement cycle;

a command or subcommand that the ultrasonic sensor is to perform the measurement in the immediately following ultrasonic measurement phase with an ultrasonic burst that is to show a chirp corresponding to a last immediately preceding chirp direction in the immediately preceding ultrasonic measurement cycle;

a command or subcommand that the ultrasonic sensor is to perform the measurement in a subsequent ultrasonic measurement phase with an ultrasonic burst that is to show a chirp opposite to a previously performed chirp direction in a previously performed ultrasonic measurement cycle;

a command or subcommand that the ultrasonic sensor is to perform the measurement in the immediately following ultrasonic measurement phase with an ultrasonic burst that is to show a chirp opposite to the last immediately preceding chirp direction in the immediately preceding ultrasonic measurement cycle;

a command or subcommand that the ultrasonic sensor is to perform the measurement in a subsequent ultrasonic measurement phase with an ultrasonic burst that is to exhibit a chirp-down;

a command or subcommand that the ultrasonic sensor is to perform the measurement in the immediately following ultrasonic measurement phase with an ultrasonic burst that is to exhibit the chirp-down;

a command or subcommand that the ultrasonic sensor is to perform the measurement in a subsequent ultrasonic measurement phase with an ultrasonic burst that is to show a chirp-up;

a command or subcommand that the ultrasonic sensor is to perform the measurement in the immediately following ultrasonic measurement phase with an ultrasonic burst that is to show the chirp-up;

a command or subcommand that the ultrasonic sensor is to perform the measurement in a subsequent ultrasonic measurement phase with an ultrasonic burst that is to exhibit a predetermined frequency;

a command or subcommand that the ultrasonic sensor is to perform the measurement in the immediately following ultrasonic measurement phase with an ultrasonic burst that is to exhibit a predetermined frequency;

a command or subcommand that the ultrasonic sensor is to perform the measurement in a subsequent ultrasonic measurement phase with an ultrasonic burst that is to exhibit a predetermined or transmitted start frequency;

a command or subcommand that the ultrasonic sensor is to perform the measurement in the immediately following ultrasonic measurement phase with an ultrasonic burst that is to exhibit a predetermined or transmitted start frequency;

a command or subcommand that the ultrasonic sensor is to perform the measurement in a subsequent ultrasonic measurement phase with an ultrasonic burst that is to exhibit a predetermined or transmitted end frequency;

a command or subcommand that the ultrasonic sensor is to perform the measurement in the immediately following ultrasonic measurement phase with an ultrasonic burst that is to exhibit a predetermined or transmitted end frequency;

a command or subcommand that the ultrasonic sensor is to perform the measurement in a subsequent ultrasonic measurement phase with an ultrasonic burst that is to have a predetermined number of ultrasonic pulses;

a command or subcommand that the ultrasonic sensor is to perform the measurement in the immediately following ultrasonic measurement phase with an ultrasonic burst that is to have a predetermined number of ultrasonic pulses;

a command or subcommand that the ultrasonic sensor is to perform the measurement in one or more subsequent ultrasonic measurement phases comprising a plurality of successive ultrasonic bursts, each of which is to comprise a predetermined number of ultrasonic pulses;

a command or subcommand that signals the ultrasonic sensor to skip the command phase in n subsequent ultrasonic measurement cycles, in particular by the superordinate computer system, where n is a positive integer greater than or equal to 0;

a command or subcommand that signals that an actually following ultrasonic measurement phase of the ultrasonic measurement cycle is not executed;

a command or subcommand that signals that an actually subsequent third phase of the ultrasonic measurement cycle is not executed;

a command or subcommand that comprises one or more of the above subcommands in terms of content and/or effect; and a command that switches UART communication to a different communication protocol for communication between the ultrasonic sensor and a prior art superordinate computer system for a predetermined period of time and/or until a switchback signal occurs in the data communication.

10. The ultrasonic sensor according to claim 1, wherein:

the ultrasonic sensor is adapted to emit the ultrasonic burst or ultrasonic signal at the beginning of the ultrasonic measurement phase according to a previously received command and/or subcommand;

the ultrasonic sensor is adapted to receive and convert a reflected ultrasonic signal or ultrasonic burst into a received signal in the ultrasonic measurement phase;

the ultrasonic sensor is adapted to form an envelope curve signal from the received signal in the ultrasonic measurement phase;

the ultrasonic sensor is arranged to measure the envelope curve signal in the ultrasonic measurement phase after emitting the ultrasonic burst or ultrasonic signal and to determine a measurement value sequence;

the ultrasonic sensor is configured to determine one or more symbols for one or more detected signal objects with respective associated signal object parameters in the envelope curve signal from the sequence of measured values; and the ultrasonic sensor is arranged to transmit such symbols for detected signal objects and/or the parameters of these signal objects in the third phase of the ultrasonic measurement cycle to the superordinate computer system.

11. The ultrasonic sensor according to claim 1, wherein:

the ultrasonic sensor is adapted to transmit said ultrasonic burst or ultrasonic signal at the beginning of the ultrasonic measurement phase according to a previously received command;

the ultrasonic sensor is adapted to receive and convert a reflected ultrasonic signal or burst into a received ultrasonic signal in the ultrasonic measurement phase;

the ultrasonic sensor is adapted to form an envelope curve signal from the received signal in the ultrasonic measurement phase;

the ultrasonic sensor is arranged to measure the envelope curve signal in the ultrasonic measurement phase after the ultrasonic burst or ultrasonic signal is emitted and to determine measured values of the envelope curve signal in the ultrasonic measurement phase; and the ultrasonic sensor is adapted to:

signal an arrival of an echo at the ultrasonic sensor to the superordinate computer system in the ultrasonic measurement phase when a value progression of the envelope curve signal crosses an instantaneous value of a threshold curve in a first direction, and/or signal a temporal end of the arrival of an echo at the ultrasonic sensor to the superordinate computer system in the ultrasonic measurement phase when the value progression of the envelope curve signal crosses the instantaneous value of the threshold curve in a second direction opposite to the first direction.

12. The ultrasonic sensor according to claim 11, wherein the ultrasonic sensor is arranged to signal the arrival of the echo at the ultrasonic sensor to the superordinate computer system in the ultrasonic measurement phase synchronously with a system clock of the ultrasonic sensor and/or synchronously with a UART system clock of the UART data interface.

13. The ultrasonic sensor according to claim 1, wherein the ultrasonic sensor is arranged to signal diagnostic data, such as HW (hardware) faults of a microelectronic circuit or other device parts of the ultrasonic sensor, and other diagnostic faults of the ultrasonic sensor to the superordinate computer system in the third phase of the ultrasonic measurement cycle.

14. The ultrasonic sensor according to claim 1, wherein:

the ultrasonic sensor is arranged to transmit determined values of up to four echoes as data in the third phase of the ultrasonic measurement cycle from the ultrasonic sensor to the superordinate computer system; and the transmitted determined values can be in particular an echo height and/or a temporal echo position relative to the start signal.

15. The ultrasonic sensor according to claim 1, wherein:

the ultrasonic sensor is arranged to signal a start of the ultrasonic measurement phase in the ultrasonic measurement phase with a first pulse;

the ultrasonic sensor is arranged to signal the start of an actual measurement phase in the ultrasonic measurement phase with a second pulse; and the superordinate computer is programmed to detect a time interval between the first pulse and the second pulse to signal, wherein the time interval between the first pulse and the second pulse is indicative of a fault of the ultrasonic sensor if the value of the time interval is not within an expected value interval for the value of the time interval.

16. The ultrasonic sensor according to claim 1, wherein the command comprises a chirp direction command that specifies whether the ultrasonic burst is to exhibit a chirp-up or chirp-down frequency sweep.

17. The ultrasonic sensor according to claim 1, wherein the command comprises a protocol switching command that switches the UART communication to a different communication protocol for a predetermined time period, and wherein the ultrasonic sensor comprises a timer that automatically resets the communication back to the UART protocol after the predetermined time period expires.

18. The ultrasonic sensor according to claim 1, wherein the command comprises a measurement profile selection command that selects a predetermined measurement profile from a plurality of measurement profiles stored in the ultrasonic sensor.

19. The ultrasonic sensor according to claim 1, wherein the command comprises a phase control command that signals the ultrasonic sensor to skip at least one of: the command phase in n subsequent ultrasonic measurement cycles, the ultrasonic measurement phase, or the third phase of the ultrasonic measurement cycle, where n is a positive integer.

20. The ultrasonic sensor according to claim 1, wherein the command comprises check information including a CRC check sum, and wherein the ultrasonic sensor verifies the command using the check information before execution.

21. The ultrasonic sensor according to claim 1, wherein edge changes of the signal of the UART data interface during the ultrasonic measurement phase occur synchronously to a system clock of the ultrasonic sensor or a UART system clock of the UART data interface.

22. The ultrasonic sensor according to claim 1, wherein the data that the ultrasonic sensor transmits from the ultrasonic sensor to the superordinate computer system in the third phase of the ultrasonic measurement cycle comprises status information representing measured values of physical parameters of the ultrasonic sensor.

23. The ultrasonic sensor according to claim 1, wherein the data that the ultrasonic sensor transmits from the ultrasonic sensor to the superordinate computer system in the third phase of the ultrasonic measurement cycle comprises status information representing logical values of logical switching networks within the ultrasonic sensor.

24. The ultrasonic sensor according to claim 1, wherein the data that the ultrasonic sensor transmits from the ultrasonic sensor to the superordinate computer system in the third phase of the ultrasonic measurement cycle comprises status information reflecting results of self-tests of the ultrasonic sensor.

25. The ultrasonic sensor according to claim 1, wherein the data that the ultrasonic sensor transmits from the ultrasonic sensor to the superordinate computer system in the third phase of the ultrasonic measurement cycle comprises status information representing measured values of an ultrasonic transmission path of the ultrasonic sensor into which the ultrasonic sensor transmits ultrasonic signals and/or from which it receives ultrasonic signals.

26. The ultrasonic sensor according to claim 1, wherein the data that the ultrasonic sensor transmits from the ultrasonic sensor to the superordinate computer system in the third phase of the ultrasonic measurement cycle comprises status information indicating which type of ultrasonic burst and/or ultrasonic signal that the ultrasonic sensor intends to have emitted in the immediately preceding ultrasonic measurement phase.

27. The ultrasonic sensor according to claim 1, wherein the data that the ultrasonic sensor transmits from the ultrasonic sensor to the superordinate computer system in the third phase of the ultrasonic measurement cycle comprises status information indicating values of the ultrasonic burst and/or ultrasonic signal that the ultrasonic sensor intends to have emitted in the immediately preceding ultrasonic measurement phase.

28. The ultrasonic sensor according to claim 1, wherein the data that the ultrasonic sensor transmits from the ultrasonic sensor to the superordinate computer system in the third phase of the ultrasonic measurement cycle comprises information indicating values of the ultrasonic burst and/or ultrasonic signal that the ultrasonic sensor intends to have been received in the immediately preceding ultrasonic measurement phase.

29. The ultrasonic sensor according to claim 1, wherein the data that the ultrasonic sensor transmits from the ultrasonic sensor to the superordinate computer system in the third phase of the ultrasonic measurement cycle comprises echo information representing measured values of the echoes received in the ultrasonic measurement phase, wherein these measured values represent a number of the echo, and/or an amplitude of the echo, and/or a time of reception of the echo, and/or a confidence value for a probability that the echo is actually an echo of an object in the ultrasonic transmission path of the ultrasonic sensor.

30. The ultrasonic sensor according to claim 1, wherein the data that the ultrasonic sensor transmits from the ultrasonic sensor to the superordinate computer system in the third phase of the ultrasonic measurement cycle comprises command information indicating which command or commands the ultrasonic sensor received in one of the preceding command phases and/or in the immediately preceding command phase.

31. The ultrasonic sensor according to claim 1, wherein the data that the ultrasonic sensor transmits from the ultrasonic sensor to the superordinate computer system in the third phase of the ultrasonic measurement cycle comprises command information indicating which command or commands the ultrasonic sensor received in one of the preceding command phases and/or in the immediately preceding command phase and which determined which type of ultrasonic burst or ultrasonic signal the ultrasonic sensor emitted.

32. The ultrasonic sensor according to claim 1, wherein the data that the ultrasonic sensor transmits from the ultrasonic sensor to the superordinate computer system in the third phase of the ultrasonic measurement cycle comprises check information of the data transmitted in the third phase of the ultrasonic measurement cycle, in particular CRC data, wherein the superordinate computer system is able to check this check information to verify a proper reception of the data transmitted by the ultrasonic sensor to the superordinate computer system in the third phase of the ultrasonic measurement cycle.

33. The ultrasonic sensor according to claim 1, wherein the data that the ultrasonic sensor transmits from the ultrasonic sensor to the superordinate computer system in the third phase of the ultrasonic measurement cycle comprises check information of the information signaled in the ultrasonic measurement phase, wherein the superordinate computer system can check this check information to verify the proper reception of the information signaled in the ultrasonic measurement phase.

34. The ultrasonic sensor according to claim 1, wherein the data that the ultrasonic sensor transmits from the ultrasonic sensor to the superordinate computer system in the third phase of the ultrasonic measurement cycle comprises check information of the commands signaled in the command phase by the superordinate computer system, wherein the superordinate computer system can check this check information to verify the proper reception by the ultrasonic sensor of the commands signaled in the command phase.

35. The ultrasonic sensor according to claim 1, wherein the data that the ultrasonic sensor transmits from the ultrasonic sensor to the superordinate computer system in the third phase of the ultrasonic measurement cycle comprises check information of the commands signaled in the command phase, indicating whether the ultrasonic sensor detected an error in the transmission of one or more commands from the superordinate computer system to the ultrasonic sensor in the command phase.

36. The ultrasonic sensor according to claim 1, wherein the data that the ultrasonic sensor transmits from the ultrasonic sensor to the superordinate computer system in the third phase of the ultrasonic measurement cycle comprises test information reflecting the results of self-tests or tests of the ultrasonic sensor.

37. The ultrasonic sensor according to claim 1, wherein the data that the ultrasonic sensor transmits from the ultrasonic sensor to the superordinate computer system in the third phase of the ultrasonic measurement cycle comprises length information indicating or enabling to calculate how much data the ultrasonic sensor transmits in the third phase of the ultrasonic measurement cycle from the ultrasonic sensor to the superordinate computer system.

38. The ultrasonic sensor according to claim 1, wherein the data that the ultrasonic sensor transmits from the ultrasonic sensor to the superordinate computer system in the third phase of the ultrasonic measurement cycle is determined at least in part based on the echo received during the measurement cycle.

39. A method of communicating between a superordinate computer system and an ultrasonic sensor using a UART protocol over a UART data interface of the ultrasonic sensor, comprising:

performing an ultrasonic measurement cycle comprising three temporally successive phases, wherein the ultrasonic sensor is configured such that a same UART data line of the UART data interface is used, in a first and third phases, for transmission of data frames in accordance with the UART protocol, and, in a second phase, for transmission of signaling information not in accordance with the UART protocol;

receiving a command in UART form;

based on the received command, starting the ultrasonic measurement cycle at a beginning of a first temporal phase of the ultrasonic measurement cycle, hereinafter referred to as a command phase;

transmitting a command from the superordinate computer system to the ultrasonic sensor as to what type of measurement the ultrasonic sensor is to perform in the ultrasonic measurement cycle, said transmitting occurring in the command phase;

emitting an ultrasonic burst or ultrasonic signal at a beginning of a second phase, hereinafter referred to as ultrasonic measurement phase, wherein characteristics of the ultrasonic burst or ultrasonic signal depend on the temporally preceding and/or an immediately temporally preceding command received by the ultrasonic sensor in a temporally preceding and/or the immediately temporally preceding command phase;

interrupting communication, within the measurement cycle, according to the UART protocol during the ultrasonic measurement phase;

setting the signal of the UART data interface on the ultrasonic sensor side to a first logical value for a duration of the ultrasonic measurement phase when the ultrasonic sensor is not receiving an echo, and setting the signal of the UART data interface on the ultrasonic sensor side to a second logical value in the ultrasonic measurement phase when the ultrasonic sensor is receiving an echo, wherein the first logical value is different from the second logical value, and wherein, during the ultrasonic measurement phase, the ultrasonic sensor does not transmit any UART frames on the UART data interface, but instead drives the UART data interface continuously to a first logical value when no echo is received and to a second logical value and/or pulse sequence when an echo is received;

terminating the ultrasonic measurement phase after a predetermined time and/or when predetermined conditions are present and beginning a third phase of the ultrasonic measurement cycle;

resuming communication between the ultrasonic sensor and the superordinate computer system using a data exchange protocol corresponding to the UART protocol after an end of the ultrasonic measurement phase in the third phase of the ultrasonic measurement cycle; and transferring data in the third phase of the ultrasonic measurement cycle from the ultrasonic sensor to the superordinate computer system and wherein a plurality of ultrasonic measurement cycles are performed in succession, each ultrasonic measurement cycle comprising a command phase, an ultrasonic measurement phase, and a third phase in this order, with no temporal overlap between the first, second and third phases, and wherein communication from the ultrasonic sensor to the superordinate computer system according to the UART protocol occurs only in the command phase and the third phase of each ultrasonic measurement cycle and not in the ultrasonic measurement phase.

40. The method according to claim 39, further comprising:

setting the signal of the UART data interface of the ultrasonic sensor to the first logical value during the ultrasonic measurement phase for a predetermined pulse time duration when the ultrasonic sensor is not receiving an echo, and setting the signal of the UART data interface otherwise to the second logical value during the ultrasonic measurement phase when the ultrasonic sensor is receiving an echo, wherein the first logical value is different from the second logical value.

41. The method according to claim 40, wherein a pulse duration depends on a parameter of a received echo.

42. The method according to claim 40, wherein a pulse duration depends on an amplitude of the received echo.

43. The method according to claim 39, wherein the data transmitted from the ultrasonic sensor to the superordinate computer system in third phase of the ultrasonic measurement cycle comprises one or more of:

status information representing measured values of physical parameters of the ultrasonic sensor;

status information representing logical values of logical switching networks within the ultrasonic sensor;

status information reflecting results of self-tests of the ultrasonic sensor;

status information representing measured values of an ultrasonic transmission path of the ultrasonic sensor into which the ultrasonic sensor transmits ultrasonic signals and/or from which it receives ultrasonic signals;

status information indicating what type of ultrasonic burst and/or ultrasonic signal the ultrasonic sensor intends to have emitted in the immediately preceding ultrasonic measurement phase;

status information indicating values of the ultrasonic burst and/or ultrasonic signal that the ultrasonic sensor that the ultrasonic sensor intends to have emitted in the immediately preceding ultrasonic measurement phase;

information indicating values of the ultrasonic burst and/or ultrasonic signal that the ultrasonic sensor intends to have been received in the immediately preceding ultrasonic measurement phase;

echo information representing measured values of the echoes received in the ultrasonic measurement phase, these measured values representing a number of the echo and/or an amplitude of the echo and/or a time of reception of the echo and/or a confidence value for a probability that the echo is actually an echo of an object in the ultrasonic transmission path of the ultrasonic sensor;

command information indicating which command(s) the ultrasonic sensor received in one of the preceding command phases and/or in the immediately preceding command phase;

command information indicating which command(s) the ultrasonic sensor received in one of the preceding command phases and/or in the immediately preceding command phase and which determined which type of ultrasonic burst or ultrasonic signal the ultrasonic sensor emitted;

check information of the data transmitted in the third phase of the ultrasonic measurement cycle, in particular CRC data, the superordinate computer system being able to check this check information to verify a proper reception of the data transmitted by the ultrasonic sensor to the superordinate computer system in the third phase of the ultrasonic measurement cycle;

check information of the information signaled in the ultrasonic measurement phase, wherein the superordinate computer system can check this check information to verify the proper reception of the information signaled in the ultrasonic measurement phase;

check information of the commands signaled in the command phase by the superordinate computer system, wherein the superordinate computer system can check this check information to verify the proper reception by the ultrasonic sensor of the commands signaled in the command phase;

check information of the commands signaled in the command phase indicating whether the ultrasonic sensor detected an error in the transmission of one or more commands from the superordinate computer system to the ultrasonic sensor in the command phase;

test information reflecting the results of self-tests or tests of the ultrasonic sensor; and length information indicating or allowing to calculate how much data the ultrasonic sensor will transmit from the ultrasonic sensor to the superordinate computer system in the third phase of the ultrasonic measurement cycle.

* * * * *